United States Patent
Fiennes

(10) Patent No.: US 9,967,149 B1
(45) Date of Patent: *May 8, 2018

(54) MODULARIZED CONTROL SYSTEM TO ENABLE IOT WIRELESS NETWORK CONTROL AND SENSING OF OTHER DEVICES

(71) Applicant: Electric Imp, Inc., Los Altos, CA (US)

(72) Inventor: Hugo Fiennes, Palo Alto, CA (US)

(73) Assignee: Electric Imp Incorporated, Los Altos, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/219,180

(22) Filed: Jul. 25, 2016

Related U.S. Application Data

(63) Continuation-in-part of application No. 14/659,352, filed on Mar. 16, 2015, now Pat. No. 9,402,281, which is a continuation-in-part of application No. 13/734,976, filed on Jan. 5, 2013, now Pat. No. 8,984,107, which is a continuation-in-part of application No. 13/481,737, filed on May 25, 2012, now Pat. No. 9,288,528.

(60) Provisional application No. 61/647,476, filed on May 15, 2012, provisional application No. 61/583,299, filed on Jan. 5, 2012, provisional application No. 61/490,498, filed on May 26, 2011.

(51) Int. Cl.
G06F 15/173 (2006.01)
H04L 12/24 (2006.01)
H04L 29/08 (2006.01)
H04W 76/02 (2009.01)
H04W 84/12 (2009.01)

(52) U.S. Cl.
CPC .......... H04L 41/12 (2013.01); H04L 41/0806 (2013.01); H04L 67/12 (2013.01); H04W 76/02 (2013.01); H04W 76/10 (2018.02); H04W 84/12 (2013.01)

(58) Field of Classification Search
USPC ............... 709/223, 220, 222, 224, 200, 227; 717/121
See application file for complete search history.

(56) References Cited

U.S. PATENT DOCUMENTS

| 9,071,657 B2* | 6/2015 | Li | H04L 67/34 |
| 9,137,226 B2* | 9/2015 | Zhu | H04L 63/065 |
| 2012/0213098 A1* | 8/2012 | Sun | H04W 24/08 370/252 |
| 2013/0041997 A1* | 2/2013 | Li | H04L 67/12 709/223 |

* cited by examiner

Primary Examiner — El Hadji Sall
(74) Attorney, Agent, or Firm — Stepehn E. Zweig

(57) ABSTRACT

Internet of Things (IoT) system and method of interfacing arbitrary non-network connected devices to wireless computer networks. The invention provides a configurable wireless communications module, in either fixed or removable formats, with wireless (e.g. WiFi) network connectivity. The invention uses at least one internal processor, which is configured to operate as a sandbox or virtual machine manner to isolate the code used to operate the arbitrary non-network connected device from the code used to operate the communications module.

19 Claims, 17 Drawing Sheets

| Card Pin Number | UART1 | UART2 | UART3 | I2C1 | I2C2 | SPI1 | SPI2 | DAC | ADC | PWM | Pulse-Count | Wake |
|---|---|---|---|---|---|---|---|---|---|---|---|---|
| 1 | CTS | | TX3 | | SCL2 | | SCLK2 | Yes | Yes | Yes | Yes | Yes |
| 2 | RTS | | RX3 | | SDA2 | | MOSI2 | | Yes | Yes | | |
| 5 | | TX2 | | | | MISO | SCLK2 | Yes | Yes | Yes | | |
| 7 | | RX2 | | | | SCLK | MISO2 | | Yes | Yes | | |
| 8 | TX | | | SCL | | MOSI | MOSI2 | | Yes | Yes | | |
| 9 | RX | | | SDA | | | MISO2 | | Yes | Yes | | |

(Pins 3 = Ground, Pin 4 = Power, Pin 6 = ID chip)

MODULARIZED CONTROL SYSTEM TO ENABLE IOT WIRELESS NETWORK CONTROL AND SENSING OF OTHER DEVICES

CROSS REFERENCE TO RELATED APPLICATIONS

This application is a continuation in part of U.S. patent application Ser. No. 14/659,352, "OPTICALLY CONFIGURED MODULARIZED CONTROL SYSTEM TO ENABLE WIRELESS NETWORK CONTROL AND SENSING OF OTHER DEVICES", filed Mar. 16, 2015, now U.S. Pat. No. 9,402,281; application Ser. No. 14/659,352 was a continuation in part of U.S. patent application Ser. No. 13/734,976, "OPTICALLY CONFIGURED MODULARIZED CONTROL SYSTEM TO ENABLE WIRELESS NETWORK CONTROL AND SENSING OF OTHER DEVICES", filed Jan. 5, 2013, now U.S. Pat. No. 8,984,107; application Ser. No. 13/734,976 in turn was a continuation in part of U.S. patent application Ser. No. 13/481,737 "MODULARIZED CONTROL SYSTEM TO ENABLE NETWORKED CONTROL AND SENSING OF OTHER DEVICES", filed May 25, 2012, now U.S. Pat. No. 9,288,528; application Ser. Nos. 13/734,976 and 13/481,737 also claimed the priority benefit of U.S. provisional application 61/647,476, "MODULARIZED CONTROL SYSTEM TO ENABLE NETWORKED CONTROL AND SENSING OF OTHER DEVICES", filed May 15, 2012; application Ser. Nos. 13/734,976 and 13/481,737 also claimed the priority benefit of U.S. provisional application 61/583,299, "Method of transferring network setup information using optical signaling", filed Jan. 5, 2012; U.S. patent application Ser. No. 13/481,737 also claimed the priority benefit of U.S. provisional application 61/490,498, "MODULARIZED CONTROL SYSTEM TO ENABLE NETWORKED CONTROL AND SENSING OF OTHER DEVICES", filed May 26, 2011; the contents of all of these applications are incorporated herein by reference.

BACKGROUND OF THE INVENTION

Field of the Invention

This invention is in the field of network connectivity and computerized devices, in particular Internet of Things (IoT) methods of adding both computer network connectivity and optionally network control or monitoring to non-network connected devices.

Description of the Related Art

Many electrical devices can benefit from being networked to allow for easy control and monitoring. For example an automated watering system could be controlled by a remote computer, taking into account the weather forecast that was retrieved from a weather information provider.

Traditionally, devices that would benefit from being connected to computer networks have to be significantly re-engineered to achieve this end. Typically a communications interface has to be added, significant amounts of software and firmware have to be developed, and the product as a whole then needs to be subjected to wireless approvals testing before it can be sold. Often, buttons and indicators need to be added to the device to facilitate the configuration of the communications interface adding additional cost and complexity to the user experience.

Traditionally, to add such a connection to a device, the device vendor must add hardware to the device—both a communications interface and additional processing capabilities to deal with the burden of operating the interface. The development effort involved is not insignificant, and also places many additional burdens on support—software updates to fix bugs and add new functionality, assisting the user with installation and configuration of the communications interface. Usually, none of the aforementioned burdens are in the vendor's area of expertise, or related to the fields in which they innovate, hence distracting them from development of their core intellectual property.

Because of this vendor inexperience, and the high burden for any single company to develop an internet-based service for the devices to communicate with, allowing their states to be checked and behaviors controlled; most of the services provided for these devices are severely lacking, buggy, and do not take advantage of new technologies or potentially useful partner services.

The customers who purchase these network-enabled devices often have a poor experience with installation and operation of the network portion of the devices due to the often incomplete or buggy implementation of the network portion. In addition, the customers often find that no single vendor can provide network-enabled versions of all the devices they wish to control or monitor. As a result, they are often forced to use several different and incompatible controls or monitoring services, and often cannot link the results of monitoring one device to the actions of another device.

Prior art modular network interfaces include U.S. Pat. No. 7,702,821, which is sold as the Eye-Fi card. This card is a wireless enabled SD card—essentially a standard WiFi card in the SD form factor. Other WiFi cards, as well as other types of network cards including Ethernet cards, Bluetooth cards, and the like are also known. These prior art devices generally add the network hardware interface to the host device that they are installed in, but otherwise generally operate or act as "dumb" slave devices.

BRIEF SUMMARY OF THE INVENTION

This invention provides a standardized way to connect arbitrary devices (e.g. electrical devices) to computer networks, allowing them to be monitored and/or controlled either by users, or by algorithms executed on computers located either locally or remotely. These algorithms can take into account the states of other sensors, or indeed almost any information source that can be accessed via the internet. The invention may be considered to be an Internet of Things (IoT) type system and method.

This invention provides a standardized modular wireless communications interface (communication modules), that for the average arbitrary device producer (vendor) substantially eases the heavy burden of interface development and approval. Instead of having to laboriously develop and obtain regulatory approvals of each device on a per device basis, the standardized modular wireless communications interface can be developed and approved once, and then used for a wide variety of different arbitrary devices.

In one embodiment, the invention further integrates a programmable arbitrary device controller into its modular wireless network interface, thus removing the burden of the majority of the software development for the arbitrary device. The invention also provides a unified internet-based communications service to manage a wide variety of different communication modules and arbitrary devices. Because the invention's communication module's hardware and much of its software is common between different host devices (arbitrary devices), the high volume of communication module production can both keep the communication module cost low, and enable a much improved arbitrary device control service to be built and operated.

The hardware portion of the invention consists of a communications interface and a processor, typically packaged into a very small, easily handled module which is often a user removable module, but which also may be a non-removable module intended to be embedded in hardware. For example, one embodiment could implement the communications module with a standard SD (secure digital) card form factor. Such embodiments have advantages, because they are both familiar to users, are small and do not take up much space on an arbitrary device, are easy to handle, and also in some cases can be made compatible with actual SD memory cards.

As noted above, one of the important failings with the current art is that most communications interfaces require some sort of configuration before a new device can be used with a network. Thus arbitrary device vendors are forced to add buttons, indicators, screens or even a connector to their arbitrary device to allow a computer to be attached for configuration purposes—all of these add cost, size, and an additional support burden.

The communications module portion of the invention solves this problem by multiple means. In many embodiments, the peripheral card or communications module, be it fixed or removable may incorporate a photodiode and be configurable for wireless network access using optical configuration methods. In other embodiments, although optical configuration methods may still often be used, the communications module may also be configured as a removable peripheral card, which may be configured for network access while plugged into a first device, and then plugged into a second device, and still retain the network access configuration. In some embodiments, when the communications module is configured with a memory card (e.g. SD card) like size and electrical pinout connection, the communications module can be plugged into computers via existing memory interfaces. Once the communications card can then be configured by the computer, and then disconnected from the computer and inserted into the arbitrary device to be controlled or sensed.

To expand on the above discussion, in other embodiments, plugging into a computer for configuration is not necessary, and instead the device may be optically configured for network access, and then wirelessly programmed using WiFi connections to remote servers. In these embodiments, the communications module, although it still may be configured with a memory card (e.g. SD card) like size and electrical pinout connection, need not be confined to such a memory card configuration, and instead may be configured in other sizes and pinout configurations, removable or fixed configurations, as convenient for the problem at hand. Nonetheless, due to the large manufacturing infrastructure and low costs associated with standard memory card (e.g. SD card formats), use of such memory card formats often remains useful from a cost standpoint, even if not strictly necessary. Additionally, this format allows the vendor (manufacturer) to choose from a wide range of off-the shelf socket types and vendors to provide the electrical and physical interface for the communications module.

In some embodiments, particularly the memory card size and pinout compliant embodiments, in order to facilitate direct configuration and programming, the communications module can configure itself to appear to the computer as a storage device, such as a more or less standard solid state memory card storage device. This type of configuration has the advantage that it allows any configuration software which is needed to be executed on a setup computer or computerized device to be stored within the communications module itself, and also ensures wide compatibility.

One of the more complex issues involved with connecting a device to a computer network is the network environment itself. Networks can be badly configured, and often the owner of the network may lack the technical skills to remedy the issues—for example, if the network uses NAT (Network Address Translation), there may be no way for a device situated behind the NAT gateway to be contacted by a computer on the internet. This can be a serious impediment for many applications. Additionally, devices attempting to wirelessly connect to local WiFi networks often need information, such as service set identification (SSID) information and passwords, in order to make a successful connection.

Instead of placing a burden on the user to correct or alter their network configuration, the invention's communication's module may be configured by software to use the latest techniques, including assistance from a remote network service, to automatically examine the network environment, and configure itself accordingly.

The communication module's operating software can also be configured to maintain a bi-directional persistent internet connection, allowing the communication module to stay in constant contact with the network service. This allows asynchronous events to be passed down to the communication module whenever they occur.

According to the invention, communication module's electrical interface is further designed to allow the module to re-configure the functions of its various output pins in a multitude of ways in order to provide the best electrical and functional match for the attached device. This has the advantage of both allowing the exact same communications module to be used in wildly different arbitrary devices and applications. This also reduces the cost of adding a communications module interface to any given arbitrary device. By contrast, as noted earlier, the current art (prior art) for adding a network interface often involves adding both a communications interface and extra processing capabilities, as the device itself may either have no processing capability or is very limited in its capabilities, and this earlier approach can be very expensive.

Finally, in some embodiments, the inventions communications module may operate a virtual machine environment and/or sandbox environment within its processing module. This virtual machine environment may execute device-dependent code to control the arbitrary device itself. This separation between the housekeeping/network-related functions, and the device dependent portion of the communication module's software, is highly advantageous for several reasons. One reason is that the communication module's device dependent code can be monitored and restarted if it fails. Further, the complex network software portion of the communication module's software can then operate without interference from the communication module's arbitrary device dependent code. Thus the inventions communications module network management software can deal with housekeeping tasks such as keeping the device-dependent code up to date with the latest developments from the arbitrary device vendor.

An additional advantage of the virtual machine concept is that the module's hardware can be revised and updated, but still maintain compatibility with the vendor's device dependent code, allowing vendors to not have to worry about the complexity of areas that would normally be outside of their particular interest and competence.

Alternatively, or additionally, the communication module may operate in a sandbox mode to prevent program crashes in the arbitrary device interface code from interfering with the network control code.

Another advantage of this sandbox (virtual machine) mode is that it can prevent secrets required to secure the communications link, for example, transport layer security (TLS) keys, from being available to the application code. This can increase the security of the system by closing off a specific line of attack.

In some embodiments, the communication module's virtual machine may be provided at the remote server (207, 312, 314). This "cloud based" virtual machine approach allows users to write their own backend code (backend integrations). This cloud based virtual machine approach also has an advantage that there are fewer power and memory limitations when the virtual machine is implemented in the cloud.

In a preferred embodiment, the invention may be a system and method of interfacing arbitrary non-network connected devices to wireless computer networks. The invention provides an optically configurable wireless communications module, in either fixed or removable formats, with wireless (e.g. WiFi) network connectivity. The module also has a programmable arbitrary device controller, associated software, and at least the combination of the arbitrary device and the module also provides a unique ID code. A software token (e.g. a hardware identifying software token) assisted method may be used to associate the unique ID code with appropriate control software and this association stored in network server memory. The invention also uses an internet-based service and a local optical programmer to configure the module's wireless network configuration. Once connectivity is established, the module may upload its unique ID code to the server and receive appropriate arbitrary device control code from the server. Portable version modules may be swapped between arbitrary devices at will, and will automatically configure themselves.

Note that in addition to helping improve device connectivity and control, obtaining device code from the server using the invention's communications modules has other advantages as well. In particular, this helps the vendor fix bugs in the code, as well as to more easily roll out other code improvements to various devices in the field.

Prototypes of certain versions of the invention's communications module and system were disclosed to the public on May 16, 2012 in the form of various press releases and demonstrations. In these press releases, the communications module was referred to as an "Imp". This is in part to pay respect for the Interface Message Processor "IMP" devices that formed the basis of the ARPANET in 1969 (which later became the internet). The term "Imp" is also used in part because like mythological imps, fairies or demons, the device is both small and capable of somewhat magically activating the various arbitrary devices that it is interfaced with. In this disclosure, the communications module portion of the invention will often be referred to in the alternative as an "Imp", "Imp device", "Imp communications module", and the like. The internet based server system that helps manage and network enable the various communications modules may occasionally also be referred to in the alternative as the Imp cloud service, Imp servers, and the like.

DETAILED DESCRIPTION OF THE INVENTION

Figure 1:
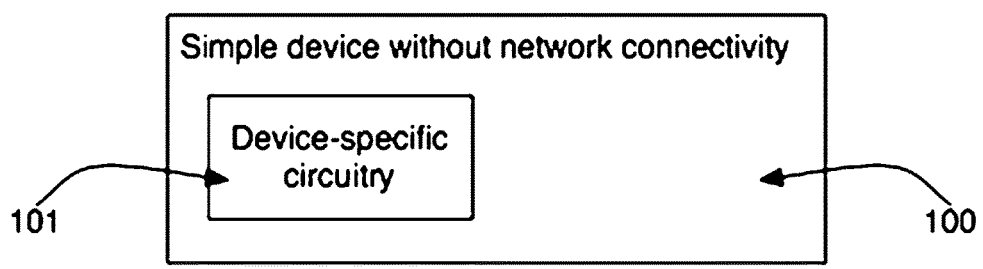
FIG. 1 shows a typical prior-art non-networked simple electrical or electronic arbitrary device.

What are the challenges with making a networked device? Some of the issues that vendors (e.g. designers, manufacturers) experience when trying to make a networked device are:

1. Wireless Design: In order to make a wireless device with good performance, vendors need to pick an appropriate wireless chipset, deal with RF design issues (antenna match, power supply quality, etc), design an antenna, and then pass costly wireless approvals tests for each territory they want to sell the device into.

Many of the best performing wireless chips are designed for cell phone usage, and so can be very small and hard to work with—e.g. 0.4 mm pitch BGAs—and including these on any given arbitrary device's PCB can hugely increase fabrication and assembly costs.

Several vendors offer wireless modules which integrate wireless circuitry and an antenna. These pre-approved modules reduce the wireless design burden somewhat, but have other failings, as detailed below.

2. Embedded Network Firmware: Every network device requires firmware that deals with network communication. This code is often frequently updated to fix bugs and improve security: these changes usually have to be integrated by the vendor, causing significant support work even after a product has shipped.

Additionally, the vendor often needs to provide software update tools to their customers so that critical updates can be applied to products in the field. This issue also can cause problem with arbitrary device storage and distribution, since devices built with buggy firmware may need to be updated before they can be sold.

3. Network Configuration: Almost every wireless protocol requires a setup procedure in order to the device to be securely connected to the wireless network. This often requires at least a dedicated button and indicator LED to be included in the product, which adds cost and complexity to the product's physical design. Indeed, this approach more often requires adding a display screen and multiple buttons to the arbitrary device, which is an unacceptable burden if these features are added solely for the purpose of configuring the device for a particular network.

4. Device Software: Besides the network software, many arbitrary devices require application software which operates the functions of the device. As with any software, there are support and update implications with shipping code, as noted in section 2 above.

5. Internet Service: A network connected device needs to provide a means for a user to access its functions.

First generation networked devices used an embedded web server to enable control, but this was often insecure and limited—for example, to access the device from outside the local network, the user needed to open a hole in their firewall. This was complex, and often required specialized knowledge and expertise to perform successfully.

Second generation devices connect to an internet service, which can relay traffic to and from the device behind the user's firewall. By logging into the internet service, users can monitor and control their device. The vendor has to design, build, operate and support this additional service.

6. Smartphone Applications: Modern networked devices often come with a companion Smartphone application. However, it is difficult to build a good Smartphone application for multiple platforms. Additionally, this approach also tends to force the arbitrary device vendor to go through the effort and expense of running an internet service to serve as the gateway to the device.

7. Integration with other devices and services: Often, users will want external actions to be linked to their devices, such as automated "battery low" emails, texts sent when movement is detected, and so on. This adds more complexity to the internet service.

8. Ongoing security maintenance: Due to the changing landscape of security threats, companies making connected devices need to be continuously vigilant against exploits and weaknesses in their products, and develop and distribute firmware updates to devices any time a weakness is found in order to keep the devices—and their customers—secure.

In one embodiment, the invention may be a method, system, or device for adding a network interface to an arbitrary non-network connected device (arbitrary device, host device). This arbitrary device will generally be at least partially electrical, and will often have appropriate electrical circuitry to implement its functionality.

As previously discussed, the invention comprises, in part, a communications module or card designed to assume at least some level of control over the host device (also designated the "arbitrary non-network connected device" or simply an "arbitrary device"). Again as previously discussed, this communication module or card may occasionally be referred to in the alternative as an "Imp", or "Imp device", or "Imp communications module".

The invention's communication module based "Imp" system was designed to help address specific problems 1-8 previously discussed above. Specifically the Imp device acts as the "glue" to connect any device to the internet in such a way that the user can gain real value from the connection.

The Imp device will typically comprise a WiFi or other short range wireless digital transceiver, such as transceivers supporting the IEEE 802.11b/g/n standards, although other standards (e.g. Zigbee, Bluetooth, etc.) may also be used. The Imp device will further comprise a processor and software with embedded network firmware. This embedded network firmware will typically comprise an internet standards compliant IP stack and TLS security to ensure easy and secure connections to internet servers such as the Imp-cloud service, which will be described in more detail shortly. In some embodiments, the Imp device may be configured to auto-update its software from authorized internet servers as needed.

In order to accommodate Imp communications modules, the arbitrary device will often be designed or modified to have a slot on its surface, underneath which will be space to accommodate a socket for the Imp device, and supporting circuitry such as connections to the arbitrary device's circuitry, an Imp device power supply, and an ID chip. This will be discussed in more detail shortly. This slot, along with the supporting socket and circuitry, may occasionally be referred to in the alternative as an "Imp slot", "Imp adapter", or "standardized slot device".

Although the communications module may assume a variety of different physical forms, as previously discussed, in a preferred embodiment, the communications module will have a standard solid state memory card physical interface, with physically compatible electrical connections. Thus, for example in some embodiments the communications module may be built on a standard Secure Digital (SD) memory card format, in which case the communications module may have the physically same electrical pins as a standard SD card (see FIGS. 15 (1500) and (1502)). Note however that the function of these electrical pins will often, at least in some Imp device software controlled configurations, differ from that of a standard SD card.

Other Imp device card formats may also be used. Although Imp device configurations other than memory cards may be used, such configurations are often convenient. Some examples of alternative Imp device embodiments may include mini SD and micro SD formats, PC cards, Compact Flash cards, Smart Media cards, Memory Stick cards, Miniature cards, Multimedia Cards, SxS cards, Universal Flash Storage Cards, xD-Picture cards, Serial Flash Module cards, μ cards, NT cards, XQD cards, and the like.

In some embodiments, the Imp communications module may also have a physical interface, and optionally even an electronic and logical interface that, in at least one mode of operation, is capable of connecting to a standard memory card reader, and then working with the memory card reader to read and write data according to standard memory card protocols (according to the particular form-factor of the communications module). Thus if the communications module is built to be compatible with a Secure Digital (SD) card, it may also be configured to store memory data like a standard SD card. In some embodiments, this may also be used for the purposes of Imp network configuration, software token writing and reading, and the like.

The Imp communications module slot in the arbitrary device will usually have a communications module interface that can interact with the physically compatible electrical connections (pins) on the Imp communications module, and carry control signals between these communications module electrical connections (i.e. pins) to at least some of the electrical circuitry in the arbitrary device. See FIG. 15 (1500) for an SD card example of these pins.

To facilitate "mix and match" functionality, in which one Imp communications module card may potentially be plugged into a variety of different arbitrary devices, in a preferred embodiment, the arbitrary device may additionally have a unique Identification (ID) storage memory device or chip (e.g. a computer memory chip and interface that is attached to the arbitrary device) that is capable of transmitting a set of unique identification data (i.e. a code number that for example may describe the type of arbitrary device, model number, revision number, and the like) from the arbitrary device to the communications module. Alternatively the ID chip can also just contain any unique number, and the Imp service server can look up the device type based on this unique number.

As previously discussed, to facilitate standardization, in some embodiments, it may be desirable to produce a standardized "slot" module to receive the "Imp" communication module or card. This standardized slot module may be configured to fit into a wide variety of different arbitrary devices. This in turn can help drive costs down, and also facilitates reliable performance due to the normal manufacturing cost and reliability versus volume curve.

Figure 15:
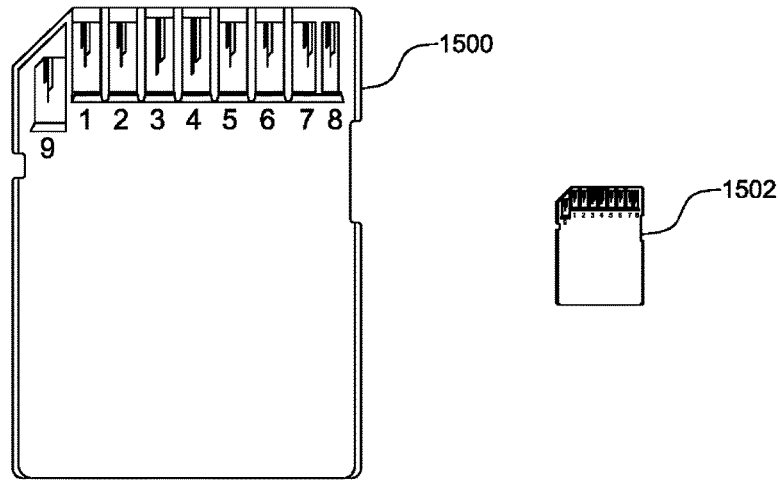
FIG. 15 shows a photograph of a typical SD card which in some embodiments may be used as the housing and interface for the Imp communications module, as well as various alternate, software configurable, Imp pin-out electrical configurations.
Figure 16:
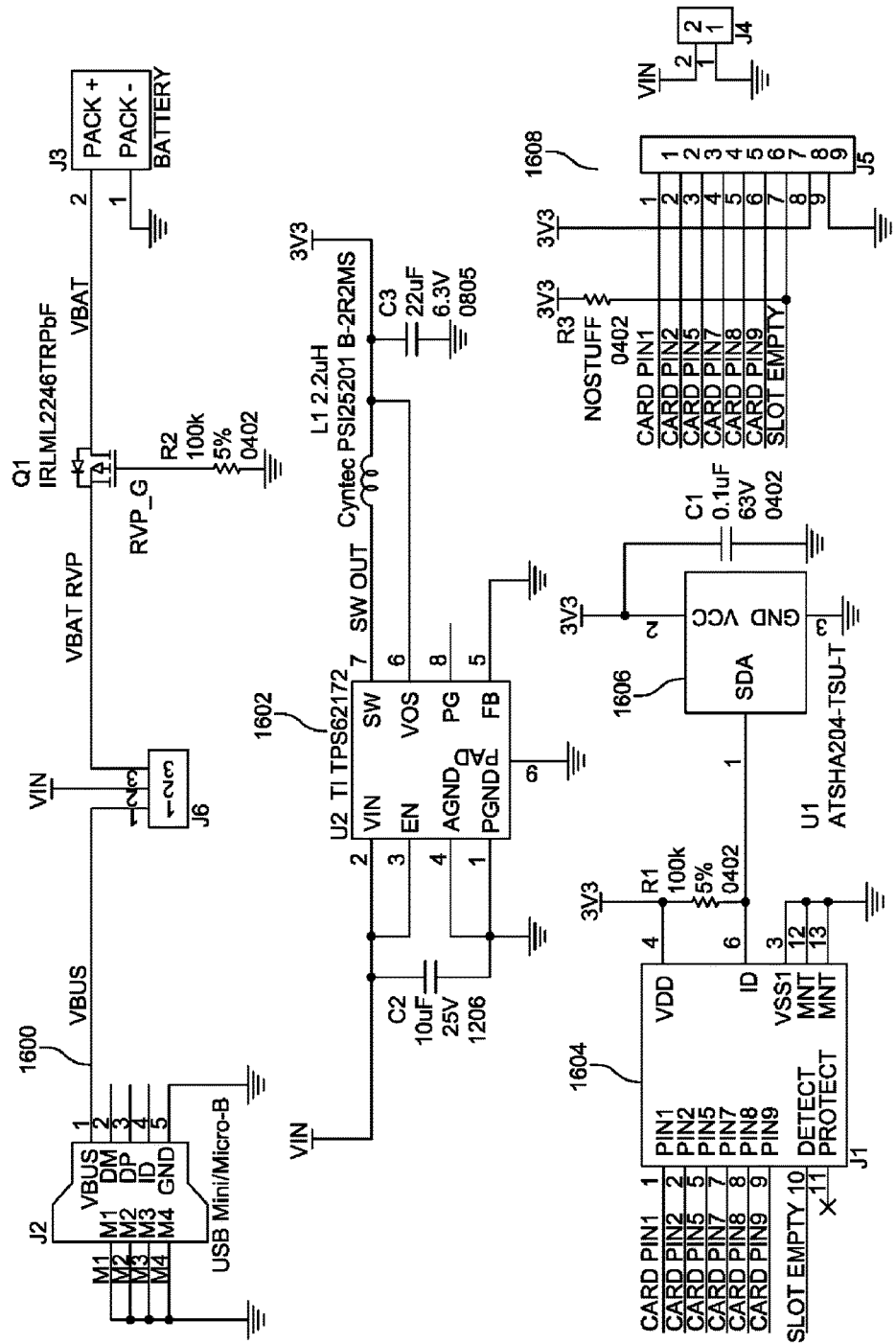
FIG. 16 shows an example of a circuit diagram of a standardized slot device for receiving the SD card type Imp communications module(s).

This standardized slot module may comprise, for example, a socket, such as an SD socket (if the "Imp" communication module or card is built using an SD card form factor), an optional power supply (e.g. a 3.3 v DC power supply capable of providing 400 mA), an identification chip, such as an Atmel ATSHA204 chip, and the like capable of identifying the arbitrary device to the "Imp" communication module or card, and interface circuitry to connect the various pins on the Imp device to the arbitrary device's circuitry. Regardless of if a standardized slot module is used or not, in general, when the term "slot" is used in this discussion, it should be assumed that the slot comprises a communications module socket, optional communications module power supply, and an arbitrary device identification chip. An example of such a standardized slot module, here called an "April development board", is shown in FIG. 15, and the electrical schematic diagram for one embodiment of such a standardized slot module is shown in FIG. 16. Note that if the arbitrary device is capable of supplying adequate power to the Imp, then the Imp standardized slot module itself then need not have a power supply.

The Imp communications module will usually also have a communications interface (often a wireless interface such as a WiFi or Bluetooth interface, but alternatively a wired interface such as an Ethernet interface, or an infrared IrDA or optical fiber interface will also suffice) capable of establishing a communications session with a computer network. Often this computer network will be the internet, although local computer networks can also be used.

The Imp communications module will also generally have internal solid state memory capable of storing code and data. In some embodiments, some or all of this code and data can be transmitted to the communications module when the communications module is connected to or programmed by a standard memory card reader, which in turn will often be connected to a computerized device such as a desktop or laptop computer, tablet computer, smart phone, and the like. Alternatively the code and data may be loaded into the communications module memory by optical and/or wireless methods discussed elsewhere in this disclosure. In some embodiments, the Imp communications modules may be configured with bootloader code to facilitate installation of this code or data.

The Imp communications module will additionally have at least one internal processor (e.g. a microprocessor, such as an ARM, MIPs, x86 or other type microprocessor, often with a 32-bit or greater instruction set and memory model). This at least one internal processor may be configured to at least execute communications code and some arbitrary device interface code when the communications module is connected to the slot in the arbitrary device.

To save memory space, in some embodiments, it may be useful to configure the Imp communications module to be capable of running high level imperative, object-oriented programming languages such as Lua, Squirrel and the like. Such light-weight scripting languages are capable of fitting in the limited memory space (such as 128 kilobytes) available to low cost microprocessors and microcontrollers. This technique helps minimize the cost of the "Imp" communications modules, while at the same time allowing the communications modules to be both highly capable and easy to configure.

To further facilitate programming, the language's standard libraries (e.g. the Squirrel standard library for example) may be further extended through the use of additional Imp specific programming API. Such Imp specific programming API can extend the language's standard library to include additional classes (e.g. Imp hardware classes), Imp control methods and functions, non volatile data storage tables, Imp pin configuration, reading, and writing methods, server login and control methods, Imp SPI serial port configuration, reading, and writing methods, Imp UART configuration, reading, and writing methods, useful constants, control flags, and the like.

Once the arbitrary device has been Imp enabled, (usually by inserting an Imp device into the arbitrary device's Imp slot) it then may be operated using the invention's various methods. According these methods, the network configuration data may be loaded into the communications module, thereby configuring the communications module to establish a network connection with a server, such as a remote internet server, that can subsequently load arbitrary device interface code into the communications module.

As will be discussed later in this disclosure, in some embodiments of the invention, it may be useful to further configure the "Imp" communications modules with photodetectors, such as visible light photodetectors. If this is done, then network configuration data, such as wireless network configuration data can be easily uploaded to the "Imp" communications module using modulated light from, for example, the light emitting display screen of a smartphone running an "Imp" network configuration app.

Alternatively the communications module may be preloaded with the device interface code and/or network configuration data.

Here it is assumed that a network connection, such as a wireless WiFi connection to the internet, or other connection is provided at least at some point during this process.

As a result of the invention's devices, system, and method(s), commands or data may be transmitted through the network (often mediated by wireless connections to the internet), to the Imp communications module, where they may be interpreted by the at least one processor running appropriate code. The commands or data may then be sent to the arbitrary device interface by way of the arbitrary device's Imp socket. That is, the at least one processor in the communications module can in turn send control signals to the arbitrary device's electrical circuitry using the communication's modules physically compatible electrical connections (pins).

Additionally or alternatively, commands or data intended to be transmitted back to the network from the arbitrary devices' electrical circuitry may be transmitted from the arbitrary device to the Imp communications module using the communications module's physically compatible electrical connections (pins). At the Imp communications module, these signals may be interpreted by the at least one processor running this code, and then transmitted to the desired network destination using the communication's module communications interface.

To better understand the invention, consider a simple non-networked arbitrary device shown in FIG. 1, which represents prior art. The device could be almost anything, whether electrical, electronic or mechanical. Examples of arbitrary devices in this context could be electrical outlets, electrical switches, home appliances (toaster, coffee machine, oven), HVAC components (thermostats, air conditioners), lighting fixtures, security or access control components (motion detectors, window sensors, badge readers, door locks), garage door openers, pool plant equipment, window openers or shade controls, and so on.

Such an arbitrary device, (100), usually contains some sort of circuitry to implement its functionality, (101). An example might be a coffee machine device, which may include a heating element and associated closed-loop control system, a pump and a pressure sensor. This circuitry may be electrically simple or complex. As another example, an alternate arbitrary device that is a window opener may contain a motor driver, position sensor and load monitoring circuitry—and may or may not already include some type of microcontroller which ensures correct operation of the system.

Figure 2:
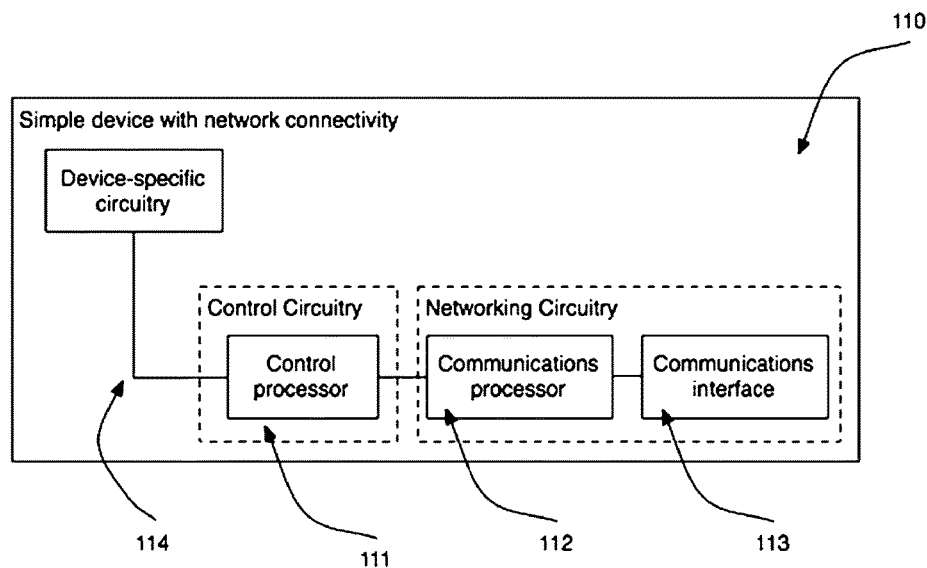
FIG. 2 shows a typical prior-art approach to adding network control to a simple arbitrary device by means of adding a communications interface, a processor to deal with the network-related processing, and optionally a control processor which deals with the actual control functions in the system

At present, when a vendor desires to add network connectivity to an arbitrary device, the vendor augments the arbitrary device internal circuitry with two or three new blocks, as shown in FIG. 2, which also represents prior art. FIG. 2 shows an arbitrary device, (110), which has been augmented with a control processor, (111), a communications processor (112) and a communications interface (113). The actual signals to control the arbitrary device, (114), are connected between the device's circuitry and the control processor.

The control processor, (112), may or may not be present in a particular arbitrary device's design (depending on the complexity of the arbitrary device). If it is not present, then according to prior art, the signals (114) would be connected directly to the communications processor.

It is worth noting that according to prior art, the control of the device-specific circuitry is not typically integrated into the communications processor. This may be because such integration requires significant software work and testing to ensure that the control functions do not interfere with the correct operation of the communications processor and vice-versa.

Figure 3:
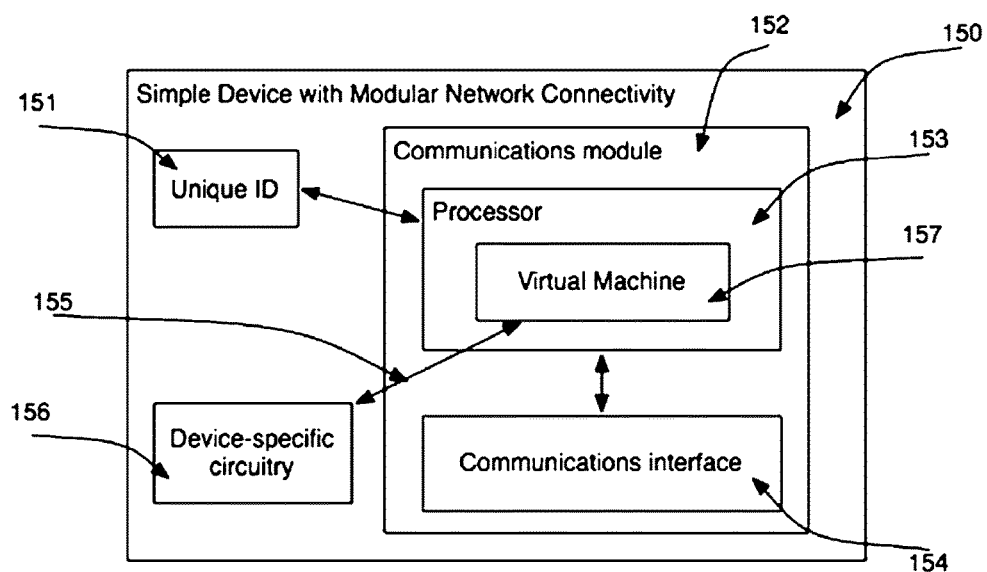
FIG. 3 shows how the invention's communications module can integrate with a simple arbitrary device.

Departing from the discussion of prior art, now consider one embodiment of the invention, which is shown in FIG. 3. FIG. 3 illustrates how the invention can be used to add network connectivity to a simple arbitrary device, resulting in the networked arbitrary device (150). In this example, the arbitrary device's circuitry (156) is directly controlled by code executing within the virtual machine (157) running in at least one processor inside the communications module (152). One particular advantage of putting such a virtual machine and at least one processor inside the communications module, and configuring the communications module to in turn to be able to directly control the arbitrary device, is that it means that the arbitrary device, which might have earlier required its own processor, now does now not necessarily need its own separate control processor. Instead the communications module at least one processor can control the arbitrary device. This substantially reduces the costs of the arbitrary device.

Thus according to the invention, the physical processor in the Imp communications module, (153), now may provide the actual electrical connectivity to the arbitrary device's specific circuitry (156). Alternatively, of course, the arbitrary device may still continue to have its own processor(s) for fallback operation when the communications module is not present. Here, for example, the arbitrary device processor(s) may be configured to act as a master when the communications module is not present, but act as a slave or even go offline entirely when the Imp communications module is present. The operating code can, as desired, also be cached when there is a connection to a server, thus enabling operation using device-specific code when there is no connection available.

The arbitrary device will often contain a unique ID block or unique identifier, (151), which is often a memory storage device of some sort (often a memory chip) which identifies the device to the Imp communications module (152). As will be discussed, this ID block or unique identifier allows the Imp communications module, if it does not already have the proper arbitrary device control code or virtual machine program stored in memory, to optionally request the correct virtual machine program from an outside source, such as a remote internet server or service, in order for the Imp communications module to operate the arbitrary device. As previously discussed, this arbitrary device ID number can be any unique number, and the server can look up the device type based on this unique ID number.

The Imp communications module communications interface (154) is usually controlled by the at least one processor (153), allowing, as needed, for bi-directional persistent connectivity to the network and the desired network devices, such as a service or server to manage the communication modules.

Note that the Imp communication module's processor may perform in different modes. In one mode, the Imp communication module's processor can take a more passive role more of just the communications peripheral to an arbitrary device. In an alternate mode, such as when inserted into an arbitrary device that lacks its own microprocessor, the Imp communications module processor can also take charge, as needed, to become the main processor or master processor in whatever arbitrary device the Imp communications module is plugged into.

In some embodiments, the Imp communications module will contain appropriate reversible solid state switches and code that enable the Imp communications module to dynamically reconfigure its electrical properties and/or logical properties of its electrical contacts (pins) to suit the specific arbitrary device that the Imp communications module is plugged into. This dynamic software-controlled reconfiguration will often be based upon a configuration and program that has been downloaded into the Imp communication module's virtual machine from a remote source, such as an internet server that provides this type of service.

Figure 4:
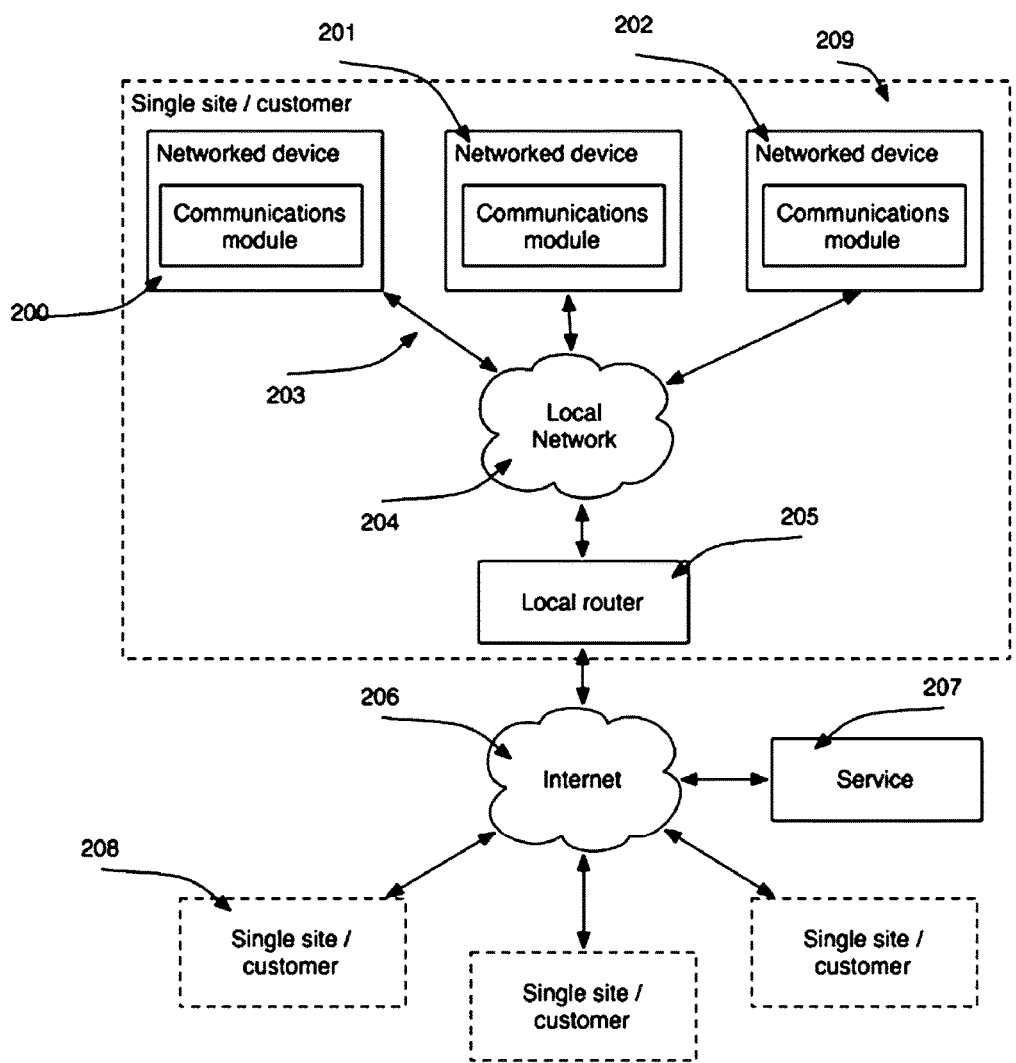
FIG. 4 gives a more detailed view of how the invention's system and internet server system can integrate with multiple sites, each of which may contain multiple networked devices which in turn each have a communications module connected to provide network connectivity.

FIG. 4 shows how a remote "service" source, such as an internet server that provides an Imp communications module management, configuration, and operating service, works according to the invention. Here for conciseness, this service will be assumed to be an appropriately configured internet server, and this server will often be referred to in the alternative as "the service", the "Imp service", "Imp server", or as the "Imp cloud service"

The Imp service, (207), as previously discussed, may be internet-connected and may consist of one or more (often multiple) physical servers which may even be situated around the world. In this later situation, in a preferred embodiment, the Imp communications modules in a given physical location might preferentially be directed towards using Imp service servers that are physically near them in order to reduce communications latency.

In some embodiments, it will be useful to configure this "Imp cloud service" so that it can be easily configured by the end user. Here various graphical programming methods and integrated development environments (IDE), where end users can simply move boxes or icons symbolizing various devices, programming commands and functions about the screen, and connect the logical flow from the various boxes by simply connecting the boxes with arrows, and/or typing simple commends into the boxes may be used (alternative non-graphical rule-based methods may also be used). Here in addition to standardized sensor reading, output functions, and device control functions, it additionally may be useful to provide other standardized programming commands as well, such as commands for transmitting RSS feeds, sending and receiving SMS messages, sending and/or receiving twitter messages, and the like. Such messages allow the "Imp" system to further leverage the extensive Internet and cell phone communications infrastructure, and further add to the versatility of the system.

Alternative methods of configuration may also be used. For example, in some alternative embodiments, the service (207, 312, and 314) or other remote internet server (or other type of server) may operate a paired virtual machine. This paired virtual machine can them execute arbitrary application code or middleware that interfaces the remote device's input and output with other servers via web APIs or other internet protocols.

Each device, (200), (201), (202), may contain a hardware identical embodiment of the Imp communications module invention, each often loaded with different arbitrary device software. The respective Imp communications module is responsible for both controlling the device and providing it with connectivity to the Imp cloud service (203), or to other designated network destination/device as desired. Thus a single physical location (site) or customer may have many arbitrary devices controlled by many different Imp communication modules.

In one embodiment, the communications from each Imp communication module connected to each arbitrary device may pass through a local network (e.g. a wireless network)—this could be either a home or a corporate network—to the local router (205), such as a WiFi router. The router may then pass traffic to and from the internet service provider who then provides the internet connectivity. Note that although Internet connectivity is highly desirable, in some applications, such as high security applications, alternate non-internet networks (e.g. local wireless LAN networks) may also be used.

As illustrated by (208), multiple sites/customers' Imp communications modules can connect via the internet to the service (Imp cloud service); the mapping is many (customers) to many (servers); the server resource may in general be shared.

Figure 5:
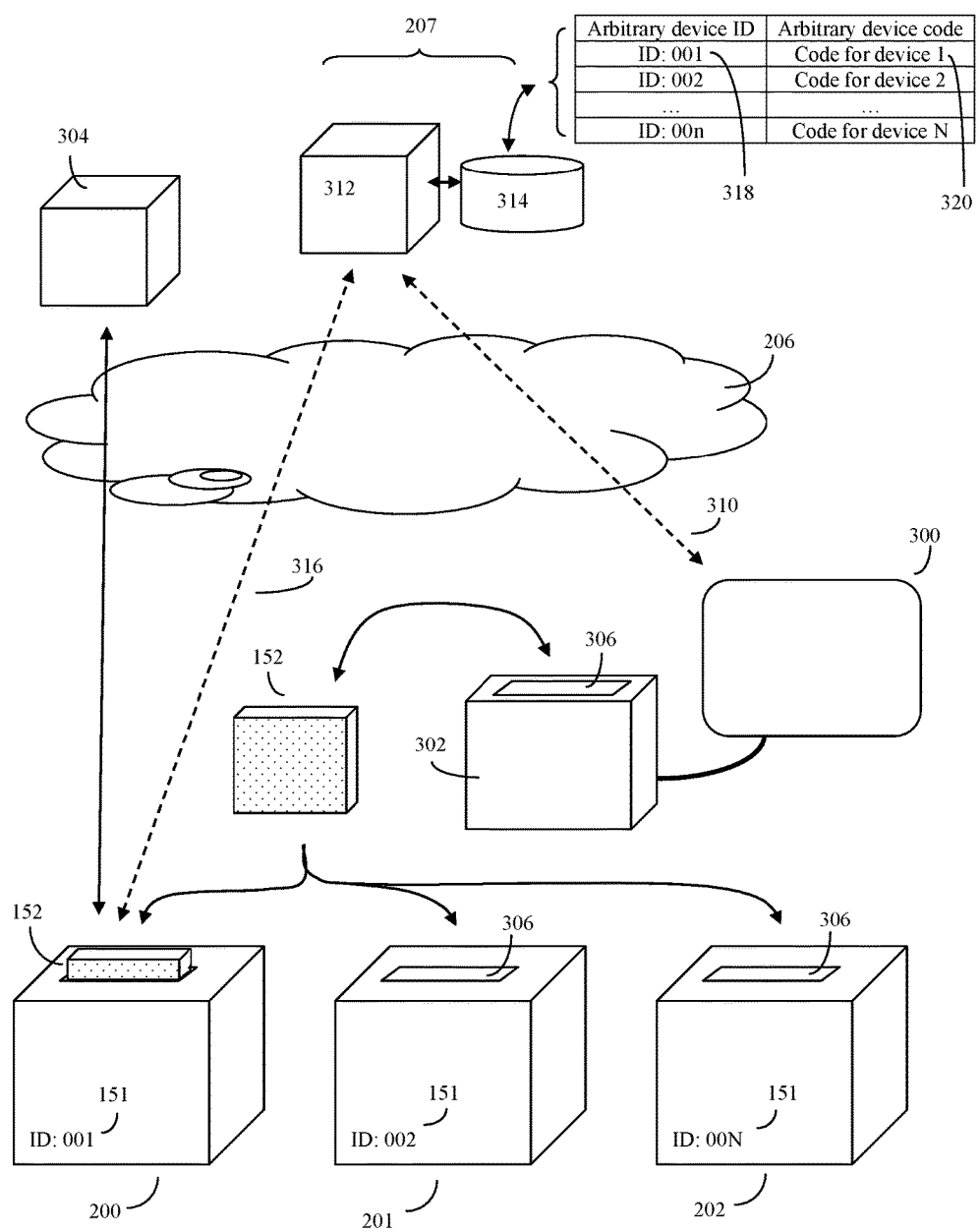
FIG. 5 shows an overview of the invention's communication's module system.

FIG. 5 gives an alternate overview of how the invention's Imp communications module may operate, this time focusing more on a combination view that shows both the physical form of the Imp communication module (152), as well as the physical slots in the various arbitrary devices (200), (201), (202). FIG. 5 also shows an optional computerized device (300) and solid state memory card reader (302) that can, in some embodiments, be used to configure or program the Imp communication modules(s) (152) and the network connection to the service (207). Alternatively this configuration may be done by alternative methods such as optical methods, to be discussed.

FIG. 5 also shows an example of an internet connection to an alternative device (304) or service. Here, for simplicity, the details of the local network (203), (204) and local router (205), previously shown in FIG. 4 are not shown again, but may be assumed to be present in FIG. 5 as well.

As can be seen, the Imp communications module(s) (152) will often plug in to various slots (306) in their respective arbitrary devices (200), (201), (202) or optional solid state memory card reader (302).

Here the same basic Imp communication module (152) may be first configured for the local network configuration (e.g. 204, 205 not shown). In some embodiments, this can be done by establishing a connection (310) to the service (207) using a computerized device (300) (e.g. a standard computer equipped with a memory card reader 302), or again by alternative methods (e.g. optical configuration methods) to be discussed. The service (e.g. Imp cloud service) will often consist of a server (312) and a database (314).

The server (312) and computerized device (300) may work together over the network (310) to determine the proper network configuration data to enable the communications module (152) to first connect to the local network (204) and router (205) and then to the internet (206). For security, the local network configuration data need not be passed to server (312). Rather server (312) can simply verify that the local network configuration data is correct. Alternatively server (312) can transmit software useful for determining the local configuration data to the local computerized device (300), as well as software useful for transferring this local network configuration data from computerized device (300) to memory card reader (302) or to an optical output device such as a display screen, and ultimately to Imp communications module (152), but again this network configuration data need not be transmitted back to server (312).

Once the Imp communications module (152) has been configured with the appropriate network configuration data, it may then be installed in the arbitrary device of choice, here device (200). Once installed in the arbitrary device (200), the Imp communications module (152) can read the arbitrary devices unique ID (151), and also establish a network communications session (316) with the service (207), specifically server (312) and database (314). During this communications session, Imp communications module (152) may transmit the unique ID (151) of its particular arbitrary device (here ID 001) to the Imp cloud service (207), server (312), and database (314). The server and database can then use this unique ID as an index to the database (318), and retrieve the appropriate code (320) required to operate or act as an interface to that particular arbitrary device (200). This can then be transmitted back (316) to the Imp communications module (152), and the module can then both act as a network interface for arbitrary device (200), and control arbitrary device (200) as needed.

Note that this scheme is quite flexible, and allows the same Imp communications module (152) to then be removed from arbitrary device (200) and placed in arbitrary device (201) or (202). When this happens, the Imp communications module can be configured to detect the change in the unique identification code (151), and again request the appropriate software or code from Imp cloud service 207 (e.g. server 312 and database 314).

When the Imp communications module is instead used in an embedded configuration, and permanently embedded into the arbitrary device, then alternative schemes may be used. For example the Imp communications module itself may have the unique ID code or unique serial number, and the association between the Imp communications module and the unique arbitrary device stored in an external database, such as an external server (e.g. service 207, 312, 314).

After the Imp communications module has been configured, it can then act as a network interface between the service (207) and the arbitrary device, or as desired can then cause the arbitrary device to now establish a network connection with a different device or alternate service (304).

Figure 6:
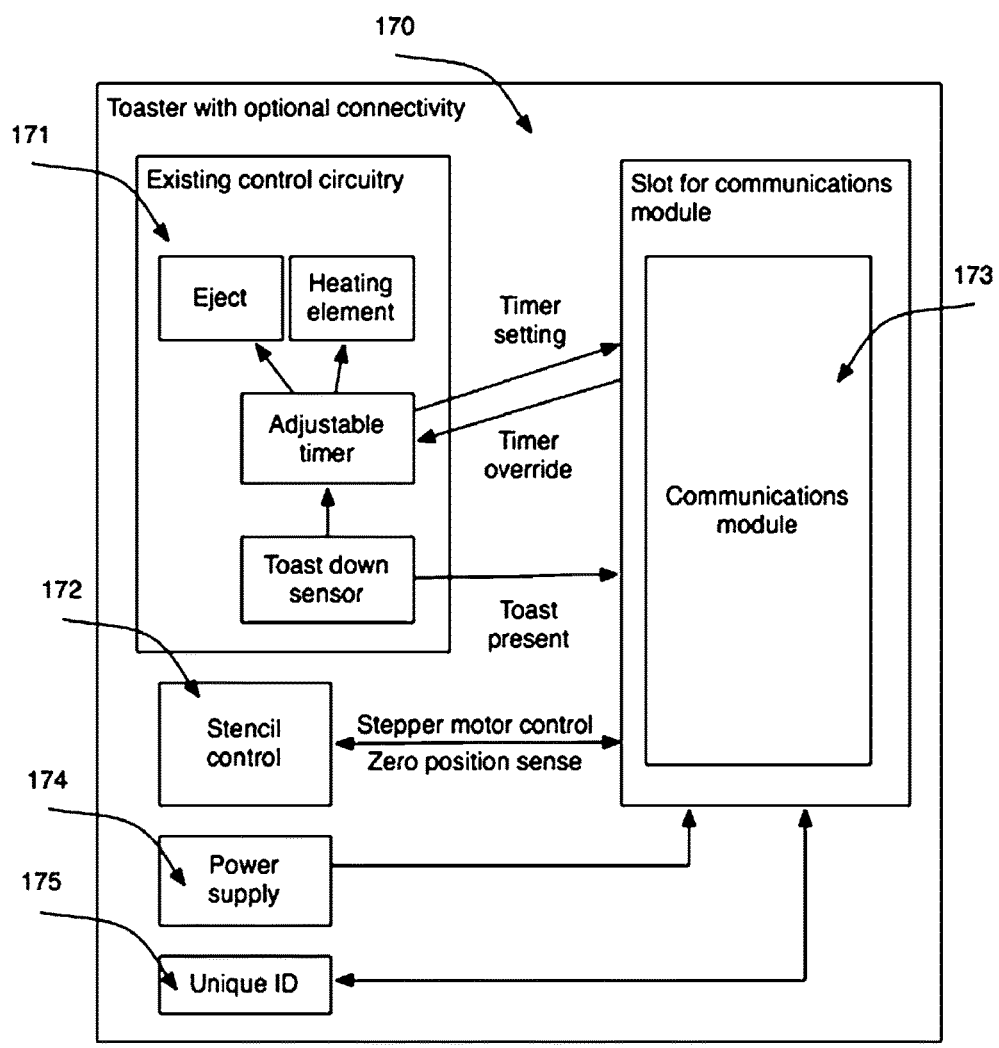
FIG. 6 gives an example of how non-network connected arbitrary device may be networked according to the invention.

FIG. 6 shows a rather fanciful but useful embodiment of an arbitrary device, (170), which features an Imp slot into which the invention's Imp communications module (here designated 173 rather than 152) can be plugged. This example arbitrary device is a standard toaster, albeit with a motorized stencil assembly added.

As with a normal toaster, the electronic circuitry included, (171), is minimal; when bread is inserted and pulled down into the toasting chamber, a timer is started which enables the heating element. After the timer (whose adjustment is the browning control) expires, the heater switches off and the toast is ejected. There is no microcontroller or other high-level intelligence in the device.

The toaster circuitry also has an Imp slot for the invention, a power supply to power it, (174), and a motorized stencil, (172), which can rotate between the heating element and the surface of the toast, in order to selectively prevent parts of the bread from receiving the heat from the element. This stencil allows, for example, a sun icon to be visible on a slice of toast in a lighter brown than the surrounding toasting by introducing the sun icon between the element and bread for a portion of the toasting period. The device also contains a unique ID, here designated as (175) rather than as (151) earlier, which identifies the device as a toaster with stencil.

In order to convey the basics of the weather forecast, the stencil might have 4 icons; sun, cloud, rain, snow and one portion with no icon that would be used when the Imp communications module (173/152) was not fitted and after the icon had been imprinted, to ensure that all of the bread received some toasting.

Without the card (173/152), the toaster functions as normal; the stencil stays in the default position (no symbol), and the toaster simply toasts. However, with the Imp communications module (Imp card) plugged in, a sequence of operations occurs: first, the Imp card identifies the appliance using the unique ID chip (175/151) and asks (i.e. sends a wireless request through the WiFi network to) the service (207), (312), (314) for the appropriate toaster operating software. The service sends back a virtual machine program which is loaded into the virtual machine in the Imp card, and this program configures the Imp card's electrical pins to suit the appliance's needs—in this case, digital inputs for "toast present" and stencil at the default (zero) position, an analog input for the timer setting (browning control), and digital outputs to override the timer and to rotate the stencil.

In some embodiments, it may be useful for service (207), (312), (314) to implement hypervisor or virtual machine monitor (VVM) functionality in order to manage/control the Imp communications module virtual machine (157). In general, either bare-metal (type 1) or hosted (type 2) hypervisors may be used.

The Imp card then waits in an almost zero power mode for bread to be inserted, which is signaled on the "toast present" digital line. When this is seen, the card signals to the service (207) that it requires a weather forecast for the user. The service fetches and parses the local weather forecast for the user's registered address (e.g. the user's physical or IP address), picking the most relevant symbol for the day's weather, and sends this back to the Imp card in the toaster, whose virtual machine program rotates the stencil as appropriate, and if necessary—based on the browning setting the user has configured and the card has sensed—extends the toasting time using the to ensure the imprint is acceptable.

This example, though rather fanciful, illustrates how the invention enables a simple arbitrary device can be augmented in interesting and novel ways without overly burdening the cost of the arbitrary device.

Further Discussion:

In alternate embodiments, the invention may also be viewed as being a method of embedding a flexible, dynamically reconfigurable Imp controller module into an arbitrary device, often as a plug in module with the form factor of a standard solid state memory card, thereby adding network connectivity to this arbitrary device. This method will generally operate using a communications module that comprises:

1: A processing subsystem, which both maintains a network connection (in order to be able to exchange data with a service) and also executes arbitrary code within a virtual machine environment for the purpose of controlling and interacting with the device it is plugged into.

2: A communications interface, to connect the processing subsystem to a local network and from there to a suitable service, such as internet server (312 or 304).

3: A flexible electrical interface to the arbitrary device, which can often be dynamically reconfigured in order to suit the requirements of the device.

4: Means (usually software code and appropriate electronic switches running inside the communications module) to optionally allow the Imp module to appear to be a standard computer peripheral in order to allow for easy configuration by computerized device (such as a standard desktop or laptop computer, notepad, smart phone, or the like) that is other than the arbitrary device.

As previously discussed, in some embodiments, this Imp communications module may be in the form of an SD (Secure Digital) card, USB stick, or other convenient form that may be easily connected to a computer for configuration purposes. Here, as before, it may be useful to configure the processing system so that the module operates a virtual machine in which device-dependent code executes.

An additional advantage of making the Imp communications module in the form of a common or popular solid state memory card format, is that this format both increases user comfort and familiarity with handling the Imp modules, and it also provides a source of standardized electrical mating connectors for the system.

As previously discussed, from an electrical standpoint, in some embodiments the Imp module can be configured to detect when it is connected to a computer for configuration, and configure itself (e.g. reconfigure the electrical properties and functions of its pins) to appear to be a compatible device (such as a standard memory card) so that computer will recognize it without any additional interaction. However when the Imp module is then connected to an arbitrary device, the Imp module can identify the device (often by reading the device's unique ID code as previously discussed), load appropriate virtual machine code from a server, and then configure or reconfigure the Imp module's electrical interface to suit the requirements of the application. Thus for example, while acting as a memory card, one particular pin may be configured for digital I/O mode only. However while acting as an interface to an arbitrary device, that same pin may be reconfigured for analog input or output.

Again, as previously discussed, from a network connectivity standpoint, the network code, after the local network environment has been sensed and the Imp communications module has been configured appropriately (often with the assistance of the remote internet service), will then be executed on the at least one processor inside the communications module, preferably in a way that isolates the Imps networking code from the Imps arbitrary device-specific code. This may be done by running the Imp's arbitrary device specific code in an Imp virtual machine or sandbox on the at least one Imp processor. Here, use of appropriate languages, such as Lua and Squirrel, previously discussed, can be useful.

Thus the Imp virtual machine that may run on the at least one processor in the Imp communications module will generally function to isolate the Imp's arbitrary device specific code (running on this Imp virtual machine) from the Imp communication's module critical networking code. This arrangement has the additional benefit that it allows the design of the Imp communications module to be updated, without the need of having to update the arbitrary device specific code. That is, regardless of what revision level the rest of the Imp communications module is, it can run the same standardized virtual machine, and thus the Imp's arbitrary device specific code is shielded from any changes in the rest of the Imp communications module. This arbitrary device specific code will, of course, be provided with connectivity services by the networking code executed on the Imp communication module's processor. This networking code, however, need not be run by the virtual machine, but instead may be run outside the virtual machine, but may optionally rely upon at least some virtual machine functions in order to present a standardized interface to the arbitrary device specific code.

An additional advantage of this approach is that it also allows authorized third parties, such as the Imp manufacturer, to perform updates (e.g. security updates) to the Imp's critical networking code without the necessity of involving the manufacturer of the arbitrary device, or other party who may have provided the Imp's arbitrary device specific code that runs on the Imp's virtual machine. This can reduce the burden on the arbitrary device manufacturer or service agent.

This makes the security problem a tractable one, as there is good alignment between the interests of the network software supplier (security) and the work required (security updates). The end product manufacturer, whose interests are usually in selling more new products vs maintaining older ones, can hence deliver products that are secure in the long term without devoting large amounts of engineering time to the problem.

Examples

Figure 7:
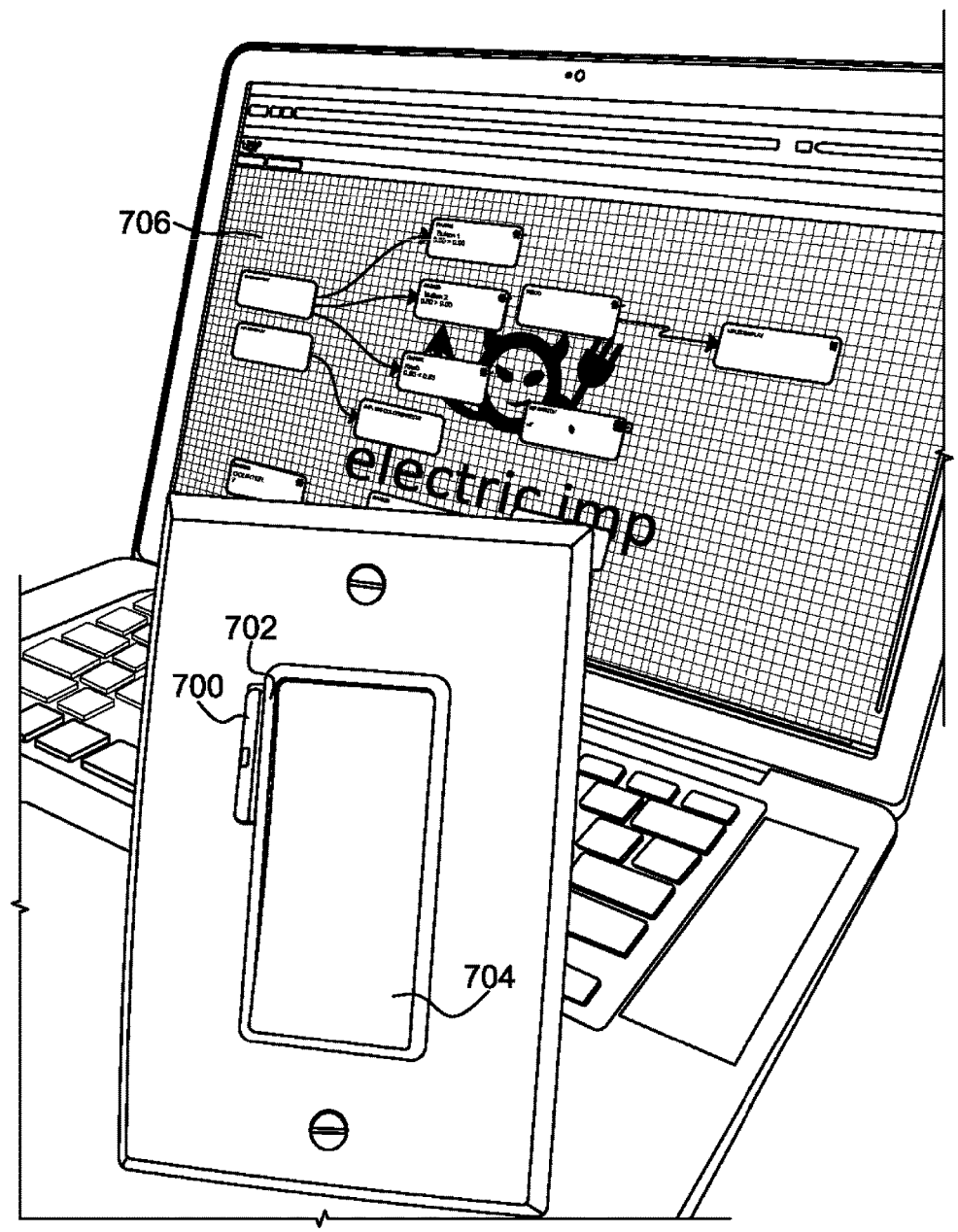
FIG. 7 shows how a light switch type arbitrary device (here a light switch) may be Imp enabled and configured using the Imp cloud service.

FIG. 7 shows an example of an "Imp" communications module (700) (here in the SD card format), connected to an "Imp slot" (702) in an arbitrary device that here is a light switch (704). In the background, the user interface of the graphical and web based programming IDE that allows the user, using a standard web browser, to quickly configure the Imp cloud service to handle this particular Imp/device combination, and to enable this particular Imp-enabled switch to control other Imp-enabled devices anywhere in the world is shown (706).

Figure 8:
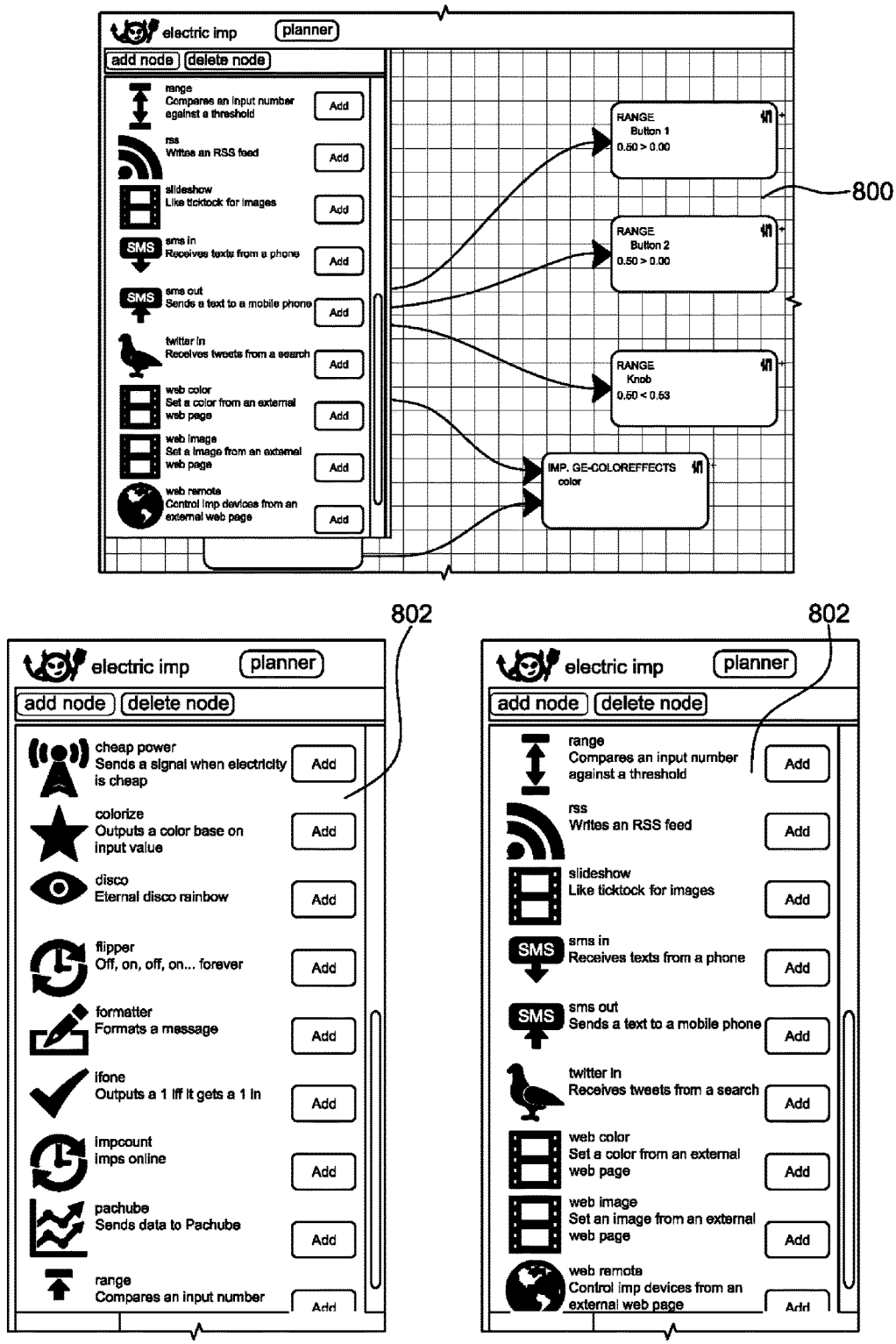
FIG. 8 shows more details of how the Imp cloud service may be simply configured using graphical programming methods on a standard web browser.

FIG. 8 shows more details of how the Imp cloud service may be configured. (800) shows the graphical "box and connected arrow" programming model of the web based IDE that enables the user to simply program the Imp cloud service using a standard web browser. Some details of the various commands available to the user are shown in (802) and (804). These commands can include commands to inform the system when electricity is more inexpensive than usual (i.e. off-peak hour rates), commands to cycle a device on and off for limited or unlimited periods of time, commands to format a message, commands to count the number of "Imp" devices online, commands to transmit the data to pachube.com (now Cosm), an internet web connectivity service, logical commands to compare Imp input data to various settings, commands to transmit RSS feeds, commands to receive and transmit SMS messages (e.g. for mobile phones), commands to control Imp devices from an external web page, and so on.

Figure 9:
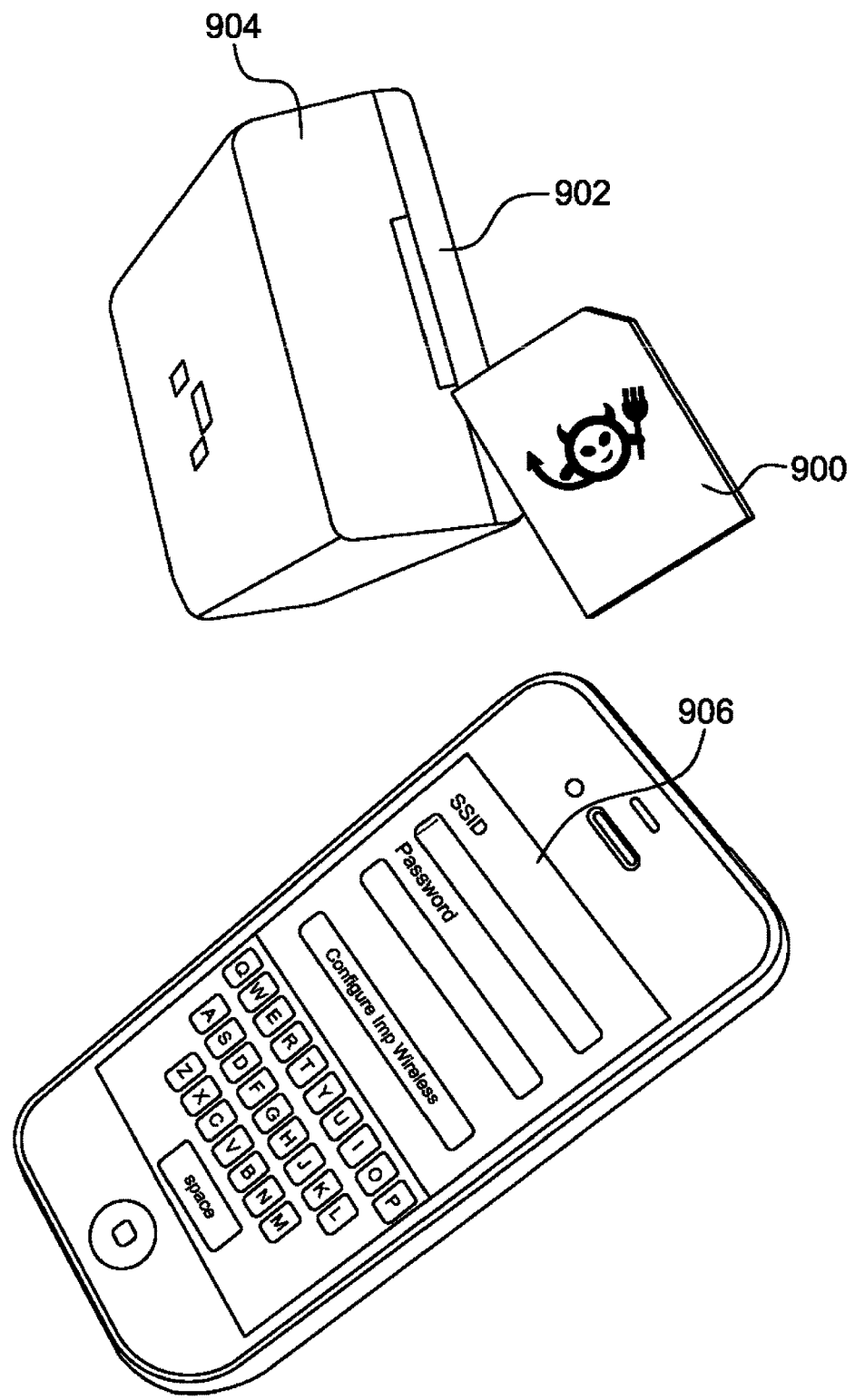
FIG. 9 shows how an Imp device can be optically configured for network access. This is occasionally referred to as a "blinkup" step.

FIG. 9 shows an example of how an Imp device may be optically configured for wireless network access. Because this optical method uses blinking light source, and because it helps link up the IMP with a network, it is occasionally referred to as a "blinkup" step. Here an "Imp" communications card (here in the SD card format) has further been equipped with a visible light photodetector, which is in turn hooked up to the Imp's microprocessor (See FIG. 10). In FIG. 9 (900), this Imp device is being placed in the slot (902) of an arbitrary device (904), which in this case is a switchable AC power outlet. In (906), the user is configuring his smartphone (here an Apple iPhone 4) to in turn optically configure the Imp device for network connectivity via the local WiFi connection to the Internet.

In this example, the communications setup used the following protocol:
Sync 8 bytes of 0xAA (alternating black and white screens): Allows calibration for brightness and timing.
0x2A data preamble byte
Byte to indicate total data length (to follow)
Data packet(s): One or more data packets of the format:
—1 byte type—1 byte length—Length bytes of data
CRC: 16 bit CRC of the data sent between the total length byte and the CRC for error detection.

Why use such optical configuration methods? As previously discussed in parent provisional patent application 61/583,299, incorporated herein by reference, one issue with networked devices is that setting them up can be complex.

To ensure secure operation, a networked device will generally require knowledge of some private credentials (at a minimum for a WIFI network, this would be the network name (SSID) and the network password).

Various prior art methods have been devised to improve this network configuration experience, including WPS (WIFI protected setup), that uses a special wireless mode and WPS enable buttons on both the WIFI access point and the device to facilitate an over-the-air exchange of access information. Although hardware implementation of such prior art methods may be simple (only a single button may need to be added, to the device) the problem is that for a device vendor to ensure maximum compatibility with the installed base of WIFI access points, the networked device must also support the older method of manual entry of network configuration data such as the SSID and password.

Due to the need to input network configuration data such as SSID and password information, implementing such network schemes can be complex and costly. At the very least, it often requires multiple buttons and a display device. For some devices this may be acceptable, as they already have a user interface that can allow for such configuration information to be entered, but often the user experience may be frustrating—passwords can be long and complex to enter, and the screen may be small and hard to read.

Some vendors, particularly those who have devices that do not already have a user interface amenable to SSID and password entry, solve this issue by including a USB plug on their device, to allow it to be connected to a PC for configuration. This improves the user experience, but requires both a cable and special software to be loaded on the PC, resulting in more cost and complexity.

To ease the burden of such configuration schemes, in some embodiments of the invention, the various Imp communications modules can additionally be equipped with a processor connected photodetector. When this is done, commonly available computerized devices with optical display screens, or other optical devices, may be used to transfer initial setup information for the networked device.

Various methods can be used to generate modulated light signals to optically configure an Imp communications module. In some embodiments, a computerized device such as a Smartphone or tablet computer can be used to generate (often via the Smartphone's display screen) a time varying light pattern that transmits the network configuration and/or setup information. Because such Smartphone and tablet devices are now nearly ubiquitous, this approach has the advantage of utilizing a device that the user already both owns and is familiar with. An additional advantage of Smartphones and tablets is that because they are hand-held, they can easily be brought close to the Imp optical sensors (e.g. photodetector) as needed.

An additional advantage of this optical configuration approach is that the Imp optical sensor(s) (e.g. a photodetector) that needs to be built into the Imp communications module device generally tends to be inexpensive, cheaper than any connector, and very robust. Such photodetectors do not require extra protective circuitry, as is usually needed with connectors or buttons. Indeed, even when the Imp communications module is installed in an arbitrary device that may already have a user interface capable of being used for SSID and password entry, the optical programming methods of the present invention can still be significantly more user friendly than alternative methods.

Figure 10:
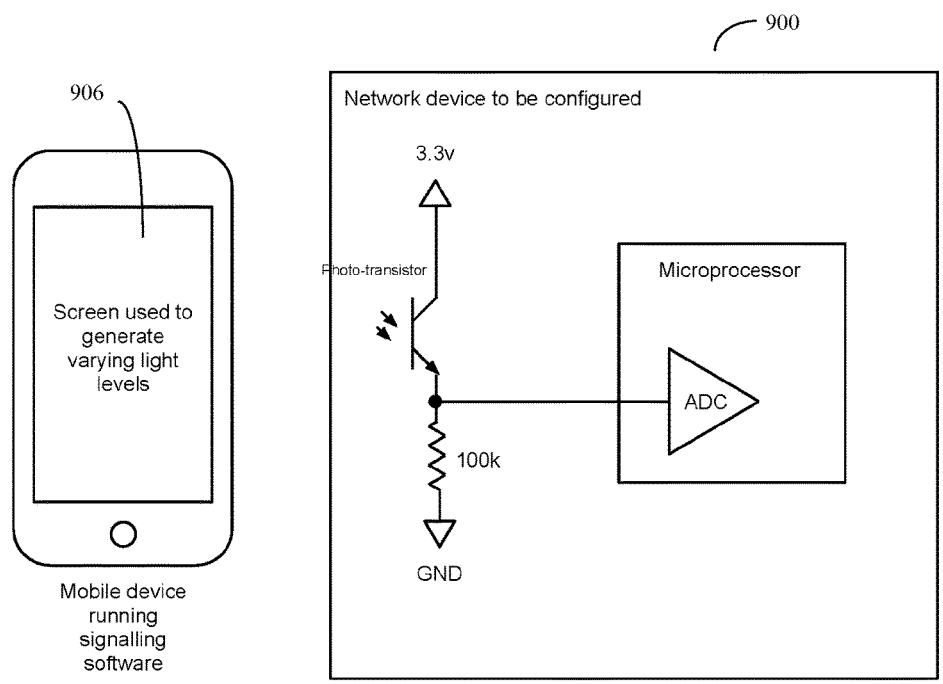
FIG. 10 shows a schematic showing the details of a photodetetector equipped Imp device.

In one embodiment of this approach, as illustrated in FIG. 10, an optical device (photodetector, photosensor), including but not limited to a phototransistor or photodiode/a simple light sensor and the like, is coupled to a processor of an Imp communications module device. Here it is not necessary to use an infrared sensitive photodetector (although an infrared sensitive photodetector may be used). Rather an optical (visible light) sensitive photodetector may be used. Thus in the examples shown in this specification, the Imp device photodetector is sensitive to the visible light spectrum (such as the light spectrum generated by a computerized mobile device's display screen). Alternatively, in other embodiments, the Imp photodetectors may be encased or otherwise covered by optical filter material to make the photodetectors only sensitive to certain wavelengths.

In the Imp prototype devices shown here, the photodetectors without built-in optical filters were used, as this allowed the Imp devices to be easily programmed by the visible light generated by a computerized device display screen (e.g. Smartphone, tablet and the like).

The amount of network configuration information that needs to be sent in a typical Imp network configuration setup (e.g. Imp communications module configuration session) transaction is relatively small, often less than 100 bytes. Thus relatively simple encoding methods can be used to transmit this small amount of data. As a non-limiting example, such network configuration data can consist of the local WiFi networks' SSID (network name) of up to 32 bytes, and a password of up to 32 bytes, along with various types of communications overhead (preamble bytes, control bytes, checksums, and the like).

Smartphones often refresh their display screens at of a constant frequency, such as 60 Hz (e.g. one display screen frame refresh every 1/60 second). In one embodiment, the transmitting device may encode one bit of data per frame update or refresh cycle. This type of scheme, although not intended to be limiting, has the advantage that it allows the whole display screen of a computerized device, such as a Smartphone, to be used to transmit the data. This in turn makes it easier to align the Smartphone (transmitting computerized device) with the photodetector or photodetector input on the Imp communications module (here acting as an optical receiver).

Thus, assuming use of the display screen of a smartphone or tablet as the optical transmitter, and assuming a constant display screen update rate of around 60 frames per second, the Smartphone can transmit configuration data at a data rate of 60 bits per second. Thus using these methods it would take about 8.5 seconds to transmit 64 byes worth of network configuration data. Other information, such as various chunks of data that can be used as software tokens for other purposes, once network configuration has been established, can also be transmitted using this method.

For smartphones or other light emitting devices that can't keep up with a 60 frames per second refresh rate, the data rate can be reduced accordingly. Similarly for light emitting devices that can maintain a higher number of frames per second, the data rate can be increased.

Often additional data, such as a header which established timing and light level information could be sent before the data, a length byte, and a checksum or CRC can be sent afterwards to ensure the data arrives without corruption, will also be transmitted. Other additional data that can be sent can include a user authentication token (e.g. an authentication number, string, or nonce) to establish that the sender has proper ownership or authorization to configure the Imp device.

As previously discussed, and as a non-limiting example, in one embodiment, the header may be initiated by having the Smartphone display screen or other optical light source (e.g. a light source controlled by another network connected Imp or "Imp in the middle") transmit an alternating white/black (binary 1/0) optical pattern for 32 cycles. This preamble allows the Imp device to determine the start of the transmission, and also allows for synchronization to be established. After this preamble, the optical transmitter may then transmit a single "magic byte", such as hex 0x2A decimal 42, to indicate the start of the actual data packet payload (i.e. the network configuration data). The system may also transmit a length byte to indicate the length of the data to follow as well. The data, of length as indicated by the length byte may then follow, and in some embodiments, two bytes of CRC (calculated using CRC-16 over the length byte and data bytes) data, or other error detection and/or correction code, may be used to end the transmission.

To reduce transmission time still further, the data rate can be increased by using shades of gray or even colors (if the Imp device has color sensitive photodetectors) to transmit more than 1 bit at a time during each display screen refresh.

Thus, for example, the optical configuration system may use two light levels to indicate a single bit of information per frame (1 frame=a choice of black or white=a 0 or 1 bit). If two gray levels were used in addition to black and white, each frame can convey 2 bits of information (level 0, 1, 2, 3=binary 00, 01, 10, 11). With 8 intensity levels, the system could convey 3 bits per frame and so on. This would result in data being transferred 2 or 3 times faster.

Other Optical Data Transmission Schemes

The display screen of the device used to optically configure the Imp may not always act in a perfect manner. In some situations, the refresh rate of the display screen (e.g. a display screen update rate, such as 60 frames per second) may not be constant. Unfortunately, this is a relatively common problem for display screens of low cost Smartphones and tablets. Here the screen may exhibit "bit-slip" (e.g. a gain of various bits, usually caused when a multitasking transmitting device is busy with other operations during transmission, and thus does not have time to draw the next bit in the screen within the display refresh interval), in which the device may repeat the frames of a particular black/white sequence.

In other cases, the display screen may suffer from other issues, such as various types of brightness fluctuations, ghosting (e.g. difficulty in showing low-luminance black screens immediately after showing a white screen), and so on.

Since compatibility with a wide range of various display screens and configuration devices is desirable, to cope with these situations, more sophisticated optical configuration techniques, such as embedding clock information into the signal output by the display screen, using edge optical transitions (e.g. using black to gray transitions to indicate a "0", and black to white transitions to indicate a "1"), Imp devices configured for use of either bilevel and/or trilevel optical receivers (or optical receiver input), and the like. Other methods, such as low pass filtering, dynamic threshold adjustment, packet validation, checksums, error correcting codes (CRC, FEC), and the like may also be used.

In some embodiments, it may be useful to embed clock information in the transmitted optical signals. Here, however, the problem is that although prior art methods to embed clock information in transmitted signals, such as Manchester encoding, are known, these prior art methods often can fail in situations where the display screen is exhibiting "bit-slip".

Manchester encoding typically uses mid-bit period transitions to transfer data (e.g. a 1 to 0 transition can be used to communicate a 1 bit; and a 0 to 1 is transition can be used to communicate a 0 bit). At a given bitrate of transmission, Manchester encoding thus halves the effective data rate, since each source bit is encoded into two bits for transmission, but there are more problems than just a slower transmission rate.

The main problem is that Manchester coding tends to fail when transmitted bits are repeated in the encoded stream during a run of the same bit. For example, consider a hypothetical data transmission event, as shown in the table below, and note how bit-slip, combined with Manchester encoding, can result in errors.

Sending Data with Bilevel Manchester Encoding, Using a Device Prone to Bit-Slip

| Bit number | 0 | 1 | 2 | 3 | 4 | 5 | 6 | 7 | 8 | 9 |
|---|---|---|---|---|---|---|---|---|---|---|
| Data to send | 1 | 0 | 1 | 0 | 0 | 1 | 1 | 1 | 0 | 1 |
| Manchester encoded | 10 | 01 | 10 | 01 | 01 | 10 | 10 | 10 | 01 | 10 |
| Bit-slip error | 10 | 01 | 10 | 011 | 01 | 10 | 10 | 10 | 01 | 10 |
| As seen by receiver | 10 | 01 | 10 | 01 | 10 | 110 | 10 | 10 | 01 | 10 |
| Decoded data | 1 | 0 | 1 | 0 | <u>1</u> | 1 | 1 | 1 | 0 | 1 |

As this example shows, due to bit-slip, the receiver (here the Imp optical receiver or Imp optical receiver input) interprets the transition incorrectly and transmitted bit number 4 has now become corrupt. The problem here is that Manchester encoding was never really intended to deal with bit-slip, but rather extracting a transmitter's regular (but unknown) clock rate.

Fortunately the display screens of even low cost devices otherwise prone to "bit-slip" can at least usually display multiple levels of brightness. Thus to resolve this issue, in some embodiments, bit-slip problems, as well as other types of problems, can be avoided by using optical data transmission methods that use multiple levels of brightness (e.g. three levels of brightness) to transmit optical configuration data. Although the following examples are based on a three levels of brightness scheme, note that additional levels of brightness (or color, and the like) may also be used, and thus these examples are not intended to be limiting.

Transmitting optical configuration data using three levels of optical brightness allows both bit-slip problems to be avoided, and also allows for a higher rate of data transmission. This is because data can be encoded and transmitted by a more complex optical brightness transition map, such as one shown in the table below:

Example of Trilevel Optical Encoding

| Current state | Black | Gray | White |
|---|---|---|---|
| New state v: Black | X | 0 | 1 |
| Gray | 1 | X | 0 |
| White | 0 | 1 | X |

This scheme can be used to encode as in the example below, assuming a start state of black, then the light intensity levels transmitted by the above trilevel encoding scheme, where 0=black, 1=gray, and 2=white, can be:

| Data transmission using trilevel optical encoding | | | | | | | | | | | |
|---|---|---|---|---|---|---|---|---|---|---|---|
| Bit number | | 0 | 1 | 2 | 3 | 4 | 5 | 6 | 7 | 8 | 9 |
| Data to send | | 1 | 0 | 1 | 0 | 0 | 1 | 1 | 1 | 0 | 1 |
| Trilevel encoded: | 0 | 1 | 0 | 1 | 0 | 2 | 0 | 1 | 2 | 1 | 2 |

However the problem with this approach is that, as can be seen in bits 6-9 in the above example, certain source bit patterns can cause the display device brightness levels to become constrained to either the upper half (gray & white) or the lower half (black & gray) of the range. This can be problematic in certain cases, due to problems such as display screen ghosting (e.g. a low cost display may, immediately after a white frame is shown, then show a next black frame as "black with a white ghost image", which of course is gray).

This could in turn cause other errors, because a black display screen bit or frame shown immediately after a white display screen bit or frame could be misinterpreted. Another problem is that other display screens, that can have unstable brightness levels, can, upon showing a gray frame twice in a row, may show the second gray screen at a significantly higher brightness level. This can be misinterpreted by the Imp as a gray to white transition.

To avoid these problems, in some embodiments of the invention, a multiple level (e.g. trilevel) optical data transmission scheme that additionally always returns the display screen to a black level between transmitted bits may be used. In this "return to black" (RTB) trilevel scheme, a "0" bit (for example) can be indicated with a "black to gray" transition and a "1" bit can be indicated with a "black to white" transition. One example of this "always return to black" scheme is shown below. Here again, 0=black, 1=gray, and 2=white, and the "return to black" aspects of this scheme require that two optical signals be sent for each bit. Here the first "return to black" optical signal is shown by the "0" portion of the "0B" optical signal, and the corresponding data bit is sent by the "B".

| Data transmission using RTB trilevel optical encoding | | | | | | | | | | |
|---|---|---|---|---|---|---|---|---|---|---|
| Bit number | 0 | 1 | 2 | 3 | 4 | 5 | 6 | 7 | 8 | 9 |
| Data to send | 1 | 0 | 1 | 0 | 0 | 1 | 1 | 1 | 0 | 1 |
| RTB Trilevel encoded: | 02 | 01 | 02 | 01 | 01 | 02 | 02 | 02 | 01 | 02 |

Here, if the display repeats a frame (exhibits bit-slip), the bit-slip is harmless (doesn't cause an error) because the Imp device can safely assume that the signal will always return to black after each bit. This scheme is also resistant to display ghosting problems as well. This is because if a black signal, due to ghosting effects, is transmitted as a false gray signal, if this false gray is followed by a real gray signal, the system will still detect an increase in the measured light intensity.

In some embodiments, to maintain backward compatibility with binary black/white optical data transmission methods, Imp devices may maintain both bilevel optical receivers (or inputs) for black and white type optical data transmission schemes, as well as trilevel optical receivers (or inputs) to be used when black/gray/white optical transmission methods are used. Here, to identify valid incoming trilevel optical data packets, PRML algorithms may optionally also be used to identify the synchronization portion of the optical configuration data pulse. The Imp may then, for example, turn off its bilevel receiver or input (if it has one) and select its trilevel receiver or input for the duration of the optical configuration session. As previously discussed, other data transmission and signal analysis methods, such low pass filtering, dynamic threshold adjustment (and reinforcement), packet validation, and the like, may also be used.

Partial Response Maximum Likelihood (PRML) Algorithms:

In some embodiments, the Imp may implement PRML algorithms by using the Imp's trilevel optical receiver's first stage input help establish synchronization, and establish a baseline threshold for subsequent signal processing. The PRML algorithms look for a positive-going excursion (pulse) that transitions or "swings" from a black level, to a higher level (gray or white), and then back to the black level. These "swing" events, which can have a magnitude associated with them, can then be passed on to the rest of the Imp's optical signal processing algorithm for processing (often using the Imp's processor).

Here, for example, a transmitted sync byte 0x2a could be represented and transmitted by the display device using a sequence of optical frames such as: 0 1 0 1 0 2 0 1 0 2 0 1 0 2 0 1 in sequence (0=black, 1=gray, 2=white).

These optical signals would be detected by a photodetector, which is either a part of the Imp, or alternatively by an external photodetector (perhaps mounted on the arbitrary device) that in turn feeds the corresponding electrical signal into an Imp optical input. At the Imp, the received optical frames can be detected and translated into swing magnitudes by the Imp receiver's first stage input processing. Here, for example, a 12-bit analog to digital converter (ADC) can be used to sample the input at a certain rate that is often a multiple of the expected date transmission rate. This sampling rate will usually be at least the Nyquist frequency, and often higher, such as a rate of 16× times the frame rate of a typical Smartphone that may refresh its screen at 60 Hz (e.g. 960 Hz). Such higher sampling rates can help enable enough granularity to deal with a wide range of display frame rates.

In this scheme, the output of the Imp's optical first stage signal processing for an originally transmitted optical signal sync byte, such as a 0x2a sync byte, 0,0,1,0,1,0,1,0, may, for example, look like this:

(Oldest first): 500, 520, 1000, 475, 1100, 550, 1050, 500. This example shows that in real life, the magnitude of a 0>1>0 swing and a 0>2>0 swing will not be completely constant. Instead these values will depend on various environmental factors, Imp ADC accuracy, and so on.

In some embodiments, the Imp PRML filter looking for an initial 0x2a sync byte (or other sync pattern) can maintain a FIFO buffer of the last series of received swings that have been received. For example the FIFO buffer can hold the last 8 swings received, and then apply a PRML algorithm to them:

Assume in this example that the last 8 swings are indeed a series of 0x2a sync bytes, and hence the 1st, 2nd, 4th, 6th and 8th swings are "low" bits. The Imp optical signal analysis software can analyze these signals by taking the average of these various 0x2a sync bytes stored in memory to determine an "average low" ADC value, such as: (500+520+475+550+500)/5=509.

It then follows that the 3rd, 5th, and 7th swings must be "high" bits. The Imp optical signal analysis software can take the average of this assumption also: (1000+1100+1050)/3=1050

If the Imp optical signal analysis software finds that the "low" average is above the "high average", this cannot be valid. Thus the Imp optical signal analysis software can be programmed to reject the FIFO content at this point and wait for the next swing value to be pushed into the FIFO before considering it again.

In this example, the Imp ADC threshold for considering a bit a "1" can be preset to be halfway between these two values, such as: (509+1050)/2=779.

The Imp optical signal analysis software can then apply this threshold to the swing values to recover the byte: 0,0,1,0,1,0,1,0=0x2a. This matches the expected 0x2a sync byte and hence the Imp optical signal analysis software will treat it as a valid sync byte.

However if the Imp optical signal analysis software looked at the contents of the FIFO buffer one sample before this point, the algorithm would have reject it. This is because (assuming that the previous value was 500, so the last 8 values were: 500, 500, 520, 1000, 475, 1100, 550, 1050), then:
Average low=(500+500+1000+1100+1050)/5=830
Average high=(520+475+550)/3=515
Low>High: rejected!

Practical experience has shown that this type of PRML algorithm is very good at identifying sync bytes in noisy signals. Note that although the above examples used sync bytes, this type of algorithm will work well for other types of sync patterns as well.

Regardless of optical encoding scheme, to perform the setup operation, the user may enter the necessary details on their mobile device, often using an app (software application) designed for this purpose. Alternatively, the transmitting program app on the mobile device can be designed to automatically extract the necessary details from the device's own wireless setup. This is shown in FIG. 9 (906). The user then presses a start button, which would prompt the user to turn the mobile device screen towards the optical device, and initiate an audible countdown.

Figure 11A:
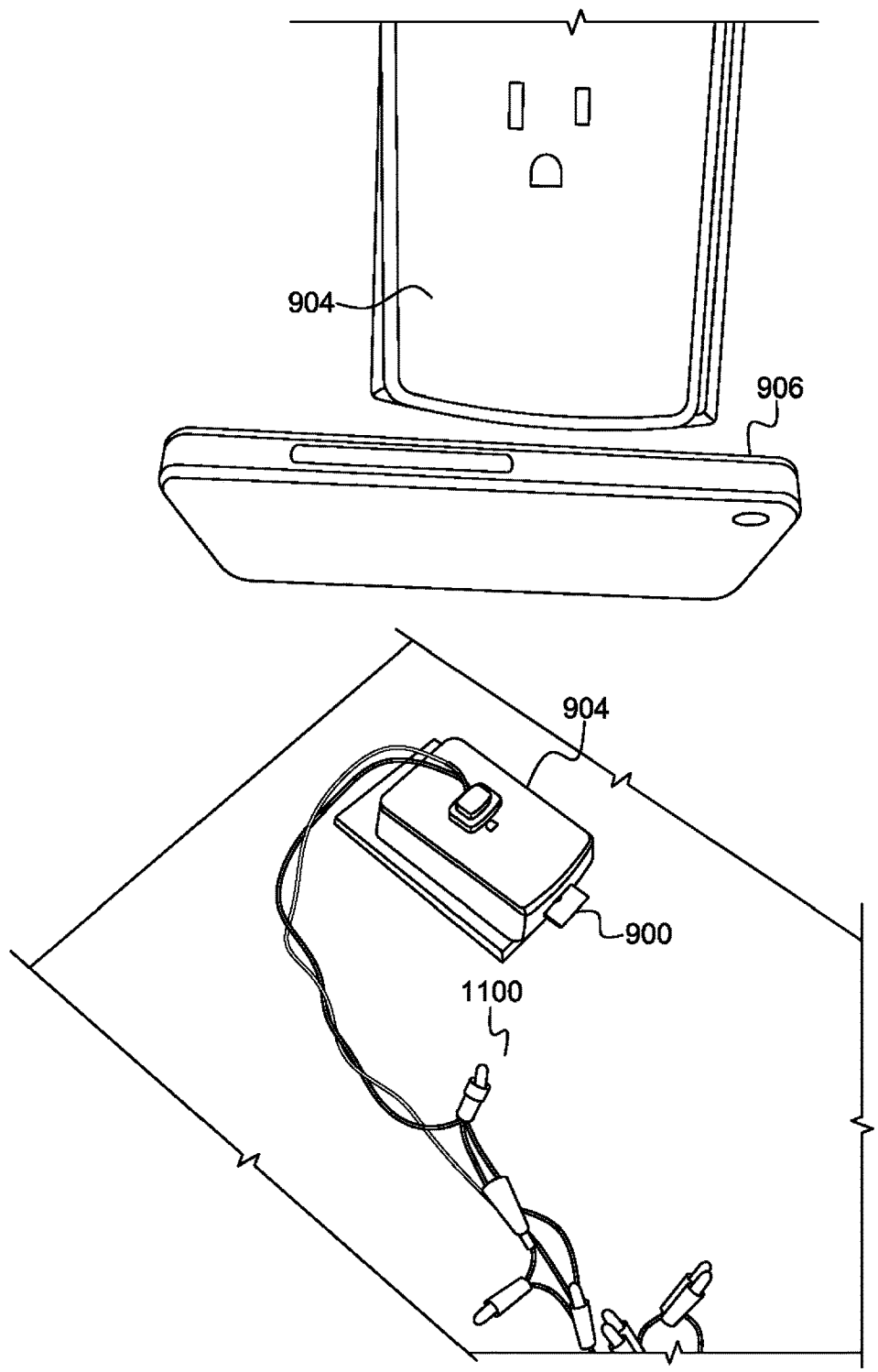
FIG. 11A gives an example of a user optically configuring an Imp-enabled arbitrary device (here an AC power switch) for network access using a Smartphone device.

The user then holds the mobile device screen up to the photodetector on the Imp communication module (e.g. the receiver's sensor, or the Imp optical input which may be coupled to an external photodetector), ideally as closely as possible to minimize any signal distortion caused by ambient light. This is shown in FIG. 11A (904), (906).

The network configuration data for the Imp communications module is then sent optically. When the transfer is complete, the app can signal completion by issuing another mobile device prompt, such as an audio "beep", indicating completion. This is useful to the user, who may be holding the mobile device's screen up to the Imp, and who thus may have difficulty reading the screen directly at this point.

In some embodiments, the Imp may also require that a correct user authentication code or nonce, or user association token also be optically transmitted before the Imp allows its network configuration data to be changed, and before the Imp signals completion. This nonce or authentication code can be acquired by various methods. In some embodiments, the user's mobile device may request this nonce or authentication code from a remote server, such as an Imp service remote server, to identify this particular Imp configuration session. Here, configuration may be regarded as being fully complete only when the remote server, such as the Imp service remote server, detects the presence of the Imp on the network. This presence may be detected when, for example, the remote server receives an inbound connection from the Imp which specifies the user association token that was requested by the mobile device. When this occurs, the remote server can then relay the fact that the Imp has been configured and connected successfully back to the mobile device (e.g. Smartphone with display screen).

The Imp communications module can then verify the network configuration, and optionally indicate success through other visible indicators (here the Imp communications module may have a built in light emitting diode for this purpose) or through the mobile device's UI by using the newly established network connection to send a "connection successful" message to a server that then relays the message to the mobile device (e.g. Smartphone) the user is holding.

Note that this method does not require two-way communication between the mobile device (e.g. Smartphone with display screen) and the Imp device. This method does not even require that the mobile device (e.g. Smartphone with display screen) and the Imp device be on the same network. It only requires that the mobile device used for configuration, and the Imp, be able to talk to the same remote servers, such as an Imp configuration server.

FIG. 10 shows a schematic of the Imp from FIG. 9 (900) and the Smartphone from FIG. 9 (906).

FIG. 11A shows the user holding the smartphone (906) up to the Imp on the lower portion of the AC power switch, thus creating a modulated light signal that communicates the local network configuration to the Imp. The user then plugs a string of lights (1100) into the Imp-enabled AC power switch in order to later demonstrate the system in operation. Here the Imp (900) on the bottom slot of the AC power switch (904) arbitrary device has been partially removed from the slot to better show that the AC power switch has been Imp-enabled.

Optical Network Configuration and Software Token Methods for Arbitrary Device Manufacturing The optical configuration methods described above, often referred to as "blinkup" methods, in addition to facilitating the network configuration process for either removable Imps or arbitrary device embedded Imps, can also be used for other purposes as well. One important additional use is to assist in the manufacturing of arbitrary devices equipped with either Imp slots, or equipped with embedded Imps.

In one embodiment, the invention may also be a method of automatically configuring at least the software network interface (e.g. the external connectivity path) of an arbitrary non-network connected device. Here, in addition to network configuration for example, the optical methods may also be used to monitor production yields of arbitrary devices during manufacturing, as well as to facilitate the process of associating a unique ID code, associated with either the arbitrary device itself, or else stored in the memory of an embedded Imp, with the appropriate code (software) used to operate that type of arbitrary device.

As previously discussed, for removable Imps, a chip containing a unique ID code will be made part of the arbitrary device's electrical circuitry, usually by way of the Imp slot. However in the case were embedded Imps are being used (i.e. where the Imp communications module is soldered to the arbitrary device electrical circuitry, or placed in an internal slot in a manner so that the end user is not expected to move the Imp), such a unique ID code is not necessary (although it may be used if desired). Instead, to reduce expenses, the unique ID code itself may be placed in the memory of the non-removable (i.e. embedded) Imp communications module. Since the Imp module is fixed to the arbitrary device, this will, of course, thus also irreversibly associate the unique ID code with that particular arbitrary device.

It should also be apparent that when an Imp is intended to be embedded into the arbitrary device circuitry by methods such as soldering, then there is not necessarily a need to enclose the Imp circuitry with an outer case, such as an SD memory card case. Instead the Imp electrical circuit module can be used directly without such an outer case.

Thus in general, either the arbitrary device or the communications module will have a unique ID storage memory device capable of transmitting unique identification data. For an embedded Imp, the unique ID storage memory device can simply be the standard Imp solid state memory, although of course the unique ID code will preferably be put into a protected portion of the embedded Imp communication module solid state memory, such as a write protected portion.

To assist in arbitrary device manufacturing and/or in the process of associating the unique ID code with the appropriate software, in addition to using the Imp's photo detector based optical configuration interface to load wireless network configuration data into the device (thereby allowing the Imp communication interface to establish a wireless network connection with a computer network), the invention may also use a software token based method to help in the unique ID to code association that will often be then used throughout the lifetime of the arbitrary device to ensure that the proper type of software code is loaded into the arbitrary device's Imp.

The software token (hardware identifying token) itself need not be overly elaborate. It can be any set of bits or bytes, such as an identification number, alphanumeric code, and the like that is used to designate exactly what type of software code should be run on an Imp that is associated with that particular arbitrary device. Thus for example, the software token for a toaster version 1 made by "Toastermatic Inc." can be an alphanumeric string such as: "toaster v1 toastermatic inc", or a number that a software server, such as a remote internet based server, can use to link the software token with a particular type of code such as toaster v1 code. Software tokens can also be more complex than this as well, i.e. can have various security bits or numbers, can have the information stored in an encrypted form, and the like so long as the token performs the purpose of associating the arbitrary device electrical circuitry associated with a particular unique ID code to the correct corresponding type of software code.

Generally the software token or hardware identifying token need not be used for any purpose beyond identifying the arbitrary device upon the first connection to the server. It enables the server to perform an association step, but need not be used for other purposes. Once this initial connection and identification is performed, the server stores the association between the unique ID and the hardware type and the token need not ever be referenced again.

In a preferred embodiment, to improve security, the software token may be a random number, such as a 64 bit random number, rather than string showing a specific device name or firmware name in unencrypted form. Other numbers may also be used as software tokens, however.

All Imps generally are configured with their own unique Media Access Control (MAC) address. This MAC address uniquely identifies the Imp network address, and may for example be a 48 or 64 bit code. In some embodiments, such as when an Imp enrollment card is being used, this Imp MAC address itself may serve as the software token (hardware identification token). Here, for example, a manufacturer can designate a random removable Imp as an Imp enrollment card by contacting the Imp control server, entering in that Imp's MAC address (assuming that this address is printed on the back of the Imp card, or otherwise available) and telling the server that an Imp with a particular MAC address is going to be used as the Imp enrollment card for a particular arbitrary device, such as a toaster. The server can then treat the MAC address as a type of software token, and proceed accordingly.

In some embodiments, other types of tokens may also be used to enable other types of associations, for example to associate an arbitrary device with a particular user (e.g. user association token). Here, for example if a toaster vendor wishes to associate a particular device, such as toaster, to a particular user, the smartphone app that the user uses to configure the arbitrary device can also be designed to provide a user association token that represents that particular user, and this user association token can also be sent optically to the Imp.

In this way, when the arbitrary device connects to the Imp service server, the user association token can, for example, be passed on to the arbitrary device vendor's server, so that the arbitrary device vendor knows which particular user the arbitrary device (here again a toaster) belongs to. The toaster vendor's server would then have the option of storing an association between that toaster's unique ID and that particular user's account, even though the more general Imp service server may not track this information.

After the software token (hardware identification token) has been initially used (usually by the arbitrary device manufacturer) to associate a particular unique ID code with a particular type of software code, and this association then stored in a server, the software token then no longer must be used. Instead, the server can then associate the unique ID code directly with the type of code. The underlying logic of the software token based association process done in manufacturing can be thus:

1: The software token is initially associated with the proper type of code (usually in the server)

2: The manufacturer associates the arbitrary device (or embedded Imp/arbitrary device) unique ID code with the software token, and transmits this association to the server. Alternatively, the manufacturer may make an association between an enrollment device (e.g. Imp, Imp-in-the-middle, enrollment Imp) and a hardware type, and the system can generate a software token that refers to this association.

3: The server, knowing that the software token is associated with the proper type of code, and knowing that the unique ID code is associated with the software token, thus can make the logical connections and store a record that the unique ID code is therefore associated with the proper type of software code.

Various software token based methods may be used to associate a unique ID code to the proper type of software code.

In one embodiment, which is highly appropriate for embedded Imp communication module situations, the previously discussed optical configuration methods may, in addition to transmitting wireless network configuration data, also be used to load the software token into the embedded Imp's memory as well. As a result, when the arbitrary device embedded Imp then establishes a connection with the appropriate server, in addition to transmitting the unique ID code of the embedded Imp/arbitrary device combination to the sever, the software token can also be transmitted to the server as well. The server, which may be a server that handles many types of different software code for many different types of different arbitrary devices, will generally be configured in advance with the association between particular software token and a particular type of arbitrary code.

As a result, when the server sees an incoming software token and unique ID code pair from a particular embedded Imp/arbitrary device combination, the server, knowing what type of code that the incoming software code is associated with, can then make the logical association between the unique ID code and the appropriate software type, and then store this in memory for future use. This future use can include use for software updates and the like.

As an example, consider a manufacturing floor where arbitrary devices are manufactured in groups of 100 devices. These arbitrary devices may all have embedded Imps, and the embedded Imps may be identical (i.e. same hardware, same initial set of software) to any embedded Imp ever produced for any type of arbitrary device, with the exception that each embedded Imp may have its own unique ID code stored in memory.

Once an Imp is embedded in an arbitrary device, that unique ID code is then associated with that arbitrary device.

But how to tell an Imp software server that this unique ID code is associated with a toaster and not with some other device such as a light switch? How does the Imp control server know to send appropriate toaster code to that particular toaster embedded Imp?

To do this, the toaster manufacturer will work with the manager of the Imp software server, and they will establish a toaster software token, and also often deposit the appropriate type of toaster software code (linked with the toaster software token) with the server. Note that the token to type of code association can occasionally be complex, because multiple types of hardware could potentially share the same software code. Here the key is to form an association between a unique ID and a hardware type, and the hardware type can then specify the software that is sent to the Imp.

The embedded Imp communication modules may be initially equipped with setup code that instructs the embedded Imps that the initial set of optical configuration data, in addition to wireless network configuration information, will also contain a software token as well. The initial setup code will instruct the embedded Imps to, after making the network connection, establish a connection with the server, and transmit their respective unique ID codes and the received software token to the server. This network connected server can then store a record of the association between this unique identification data (unique ID code) and the appropriate type of software code.

The initial setup code can optionally also instruct the embedded Imps to download further code, such as arbitrary device manufacturing test code, and/or arbitrary device operating code from the server. Note that this setup code is thus quite generic, and any embedded Imp intended to be embedded in any arbitrary device of any type can thus be initially configured with the same setup code. This greatly increases manufacturing flexibility and greatly reduces costs, because embedded Imp modules can then be produced, in the millions as necessary, as a totally generic or identical product (with the possible exception that each embedded Imp will store its own unique ID code).

Returning to the manufacturing floor example, the manufacturer can test and configure his group of 100 "toaster" arbitrary devices at the same time. To do this, the manufacturer can set up a software controlled light source (which itself may be controlled by an "imp in the middle"), turn on all the toasters at once (if desired) and program the light source to transmit both network configuration data and a "you are a toaster v1" type of software token to the group of 100 toasters. The group of toasters, using their embedded Imps and the setup code, can take the optically transmitted network configuration data, optically transmitted software token, and contact the server with a series of messages such as: Imp 22359, "I am a toaster v1", Imp 22360, "I am a toaster v1" . . . (Imp 22459, I am a toaster v1"). The software server can then store this association in memory, and in turn transmit the appropriate type of toaster v1 test or operating code to this group of toasters.

This system also can help provide useful manufacturing information to the manufacturer and the manufacturer's customer. For example, assume that the server initially transmits toaster test code back to this group of 100 toaster arbitrary devices. The group of 100 toasters can test themselves, and perhaps 98% will report "success" back to the server, and 2% may report "failure" back to the server. This information can be used by both the manufacturer and the manufacturer's customer (e.g. a company that has contracted with the manufacturer to purchase a large number of toasters for resale) for quality assurance and planning purposes. Both can instantly know when toasters have been produced, and how many have passed their testing. This can greatly assist in subsequent planning and process optimization.

It will often be useful to configure the system so that the software token—unique ID association is only stored in the server when the testing is successful. This way, arbitrary devices that fail testing will not get any operating software at all. This allows defective arbitrary devices to be more easily distinguished if they intentionally or unintentionally "escape" the factory.

The same basic scheme can also be used for slot equipped arbitrary devices using removable Imps as well, with the only difference being that here, unique ID code will be obtained by the Imp from the arbitrary device, rather than from the Imp's own solid state memory. Thus the above considerations, features and benefits also apply to slot equipped arbitrary devices using removable Imp communication modules as well.

An alternative embodiment of the software token method, well suited for removable Imp communications modules that can be switched from Imp slot equipped arbitrary device to arbitrary device, and where the unique ID codes are thus part of the arbitrary device electrical circuitry (which here can be an Imp slot made part of the arbitrary device electrical circuitry) can also be implemented.

In this alternative embodiment, although optical network configuration methods may optionally be used, the software token and optionally the network configuration information instead can be provided by use of a portable "Imp enrollment card". This portable Imp enrollment card will be configured with setup software, the appropriate software token, and optionally even network configuration information so that the manufacturer at least need not use optical configuration on the manufacturing floor. The Imp enrollment card (or cards, any number can be used to speed up manufacturing) can be temporarily plugged into a manufacturing floor arbitrary device, here again possibly toasters as they run off of an assembly line. The enrollment card, which may be preconfigured for local wireless network access, will read the unique ID code for each arbitrary device as it comes off of the assembly line, and report this unique ID code, along with the software token stored in the enrollment card, to the server. The server can then as before make the logical associations between that particular arbitrary device's unique ID code, the software token, and the software token-type of software code, and again store a record that a particular arbitrary device's unique ID code is thus linked to the appropriate type of software code. Additional arbitrary device tests may optionally also be done as desired, and the results reported to the server. Once this is done, the Imp enrollment card may be unplugged from that particular arbitrary device, and used again to enroll the next arbitrary device coming off of the manufacturer's assembly line. The process can be relatively quick, on the order of a new arbitrary device enrolled on the Imp server per minute.

Put alternatively, this Imp enrollment card method, which generally is best for situations where the arbitrary non-network connected device has a slot capable of accommodating a removable Imp communications module, and where the arbitrary device has (often via the embedded Imp socket) a unique ID storage memory device capable of transmitting unique identification data, can provide the software token as follows:

The operator will generally plug a first removable Imp communications module (the enrollment Imp) containing the appropriate software token in the enrollment Imps internal solid state memory into arbitrary device's Imp slot. The enrollment Imp (often pre-configured with the wireless network configuration data) will establish a network connection with the network connected server, and transmit the arbitrary device's unique ID code and the enrollment software token to the network connected server. This allows the network connected server to record the association between that particular arbitrary device's unique ID code and the software token supplied by the enrollment Imp.

For example, if the arbitrary device is again a toaster, the enrollment Imp can carry a software token identifying the enrollment Imp as a toaster enrollment Imp, and the server can recognize that the arbitrary device's unique ID should be associated with toaster type software code.

Thus this software token can be optionally used by the network connected server to select the type of code to operate the Imp communications module. After this selection, the network connected server will then usually store (or transmit to another server) a record of the association between the unique ID and the type of code that is appropriate to use with the arbitrary device that has this unique ID.

After this enrollment, and usually after the first enrollment Imp card is removed from the arbitrary device's slot, the arbitrary device will often be shipped to a consumer.

When, for example, a consumer then uses a second removable Imp communications module (i.e. any removable Imp, which will usually not contain this software token in its internal solid state memory) is plugged into the arbitrary device slot, this second Imp communications module (often after an optional optical network configuration step) can obtain the unique ID from the arbitrary device and transmit it to the network connected server.

The network connected server can, in turn, use the unique ID to select the type of code to operate this second removable Imp communications module. As before, to do this, the server will the record of the association between that arbitrary devices's unique ID and the appropriate type of software code to do this.

What both all the basic optical configuration methods software token methods have in common, regardless of if the Imp is a removable Imp or an embedded Imp, is that the various methods use the wireless network connection, and either a the unique ID and/or a software token to load the code to operate the Imp communications module.

Further, as a common element, the unique ID data and/or the software token is used by the network connected server to select the type of code to operate the communications module, and wherein the network connected server also stores a record of the association between the unique ID data and the appropriate type of software code used to run that type of arbitrary device.

Further, as another common element, when commands or data to the arbitrary device are transmitted through the network, to the Imp communications module, these commands or data are interpreted by at least Imp one processor running the appropriate type of code. Usually this at least one processor will in turn send control signals to the arbitrary device's electrical circuitry.

Additionally or in the alternative, when commands or data from the arbitrary device electrical circuitry are transmitted to the connected Imp communications module, these commands or data are interpreted by the Imp processor running the appropriate type of software code (e.g. software programs), and as needed the processor in turn transmits the comments or data to various network destinations using the Imp communications interface.

Figure 11B:
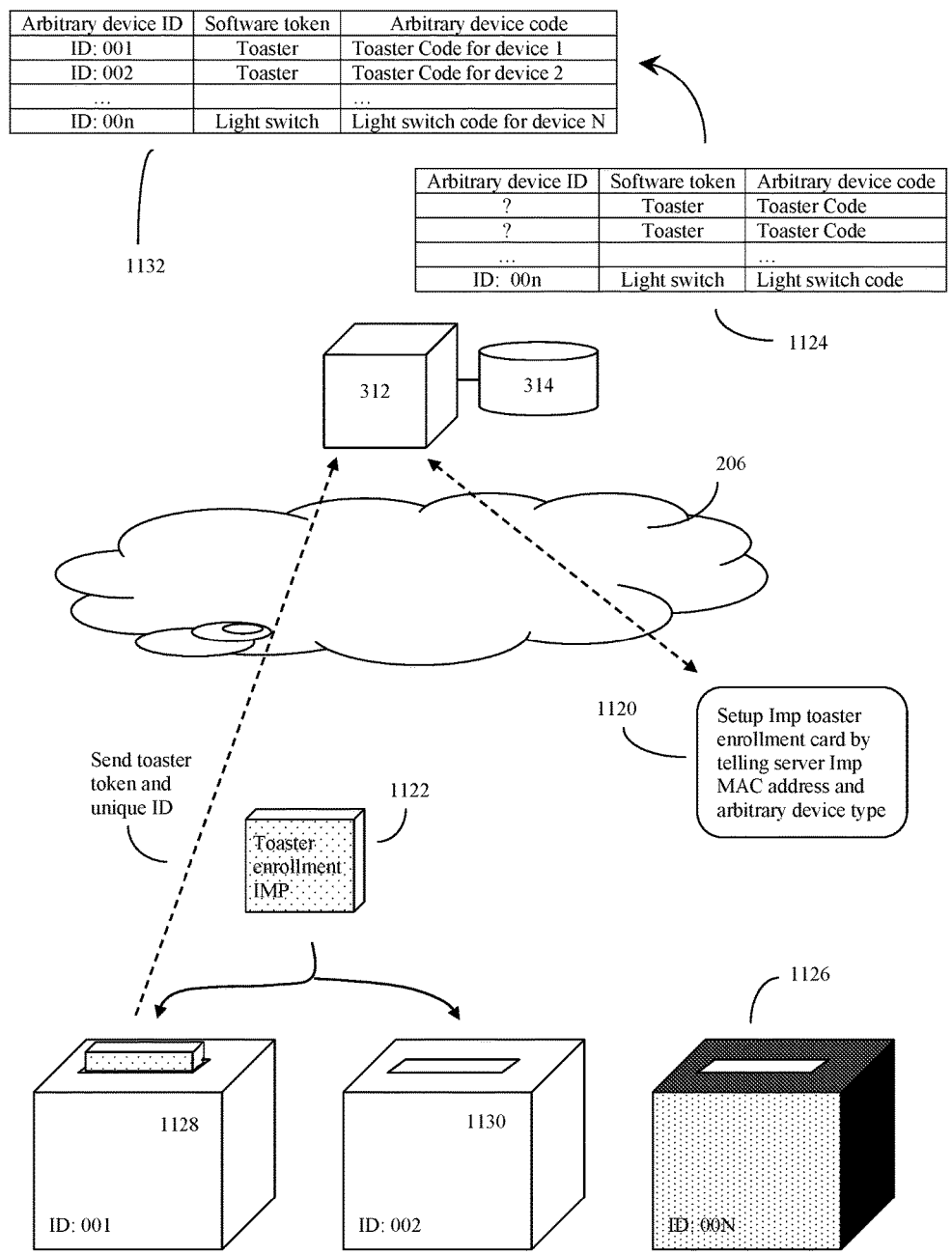
FIG. 11B shows an example of how an "Imp enrollment card" and software tokens, such as hardware identifying software tokens, may be used to create the association between a unique ID and the appropriate type of software code for a given arbitrary device.

FIG. 11B shows an example of how an "Imp enrollment card" and software tokens may be used to create the association between a unique ID and the appropriate type of software code for a given arbitrary device.

In FIG. 11, a manufacturer of "toaster" arbitrary devices can begin the process by working with the operator of the server (312), establishing a suitable "toaster" software token, and often also depositing a copy of the "toaster" type of software code associated with this particular token with the server. The manufacturer (or other party) may then configure a removable Imp (1122) to be "toaster enrollment Imp) by informing the server (312), for example by using an internet browser (1120), that the manufacturer intends to use that Imp as an enrollment Imp. The manufacturer can, for example, read off the Imp's MAC address (which may often be printed on the back of the Imp), inform the server (312) as to what type of arbitrary device (e.g. toaster) the manufacturer wishes to work with. The server (312) can then use that particular Imp's MAC address as a software token, and associate this MAC address with the appropriate arbitrary device hardware type and code type. The server can also, as needed download any appropriate arbitrary device test or setup software to that enrollment Imp as well (1122).

Note that before any arbitrary device enrollment is done, the state of the server's memory (314) shown as (1124) is such that although the software token "toaster" is associated with "toaster hardware" and hence to "toaster type code", there may not be any arbitrary device unique ID's associated with the toaster software token or with the toaster type code. However assuming that the server (312) and memory (314) are handling multiple types of arbitrary devices (such as light switch 1126), other unique ID codes, such as ID: 00n associated with light switch (1126) may have been previously associated with software tokens and the types of code appropriate for their device.

In this example, the manufacturer may start enrolling toaster arbitrary device (1128) and (1130) by first plugging enrollment Imp (1122) into toaster (1128). The enrollment Imp will read that toaster's unique ID (ID: 001) establish a wireless network connection with server (312) and transmit it to the server along with the toaster software token (such as the MAC address of the enrollment Imp (1122)). The manufacturer can then unplug the enrollment Imp (1122) from device (1128), and plug it into the next device (1130). Again the enrollment Imp will transmit that device's unique ID code (here ID: 002) to the server, along with the toaster software token. The net result of these operations can then be stored in server memory as (1132). The server now knows that arbitrary device ID 001 has been enrolled as a toaster, and arbitrary device ID 002 has also been enrolled as a toaster. Once the enrollment Imp (1122) has been removed, and the toasters (1128) and (1130) are sent out into the field, then whenever a new Imp is plugged into the toaster, the server will be able to read the unique ID, and send appropriate toaster code and data to the Imps controlling these arbitrary devices as needed.

The general principles for software token use for embedded Imps are quite similar, except that for embedded Imps, the software token can be delivered to the embedded Imps by the same optical methods that can also be used to configure the embedded Imps for network access. Thus the Imp enrollment card is not necessary, and instead the software tokens may be delivered by the optical "blinkup" methods. In this case, the software token will most likely not be a MAC address, but may be some other series of bits, such as the previously discussed random 64 bit numbers.

Figure 12:
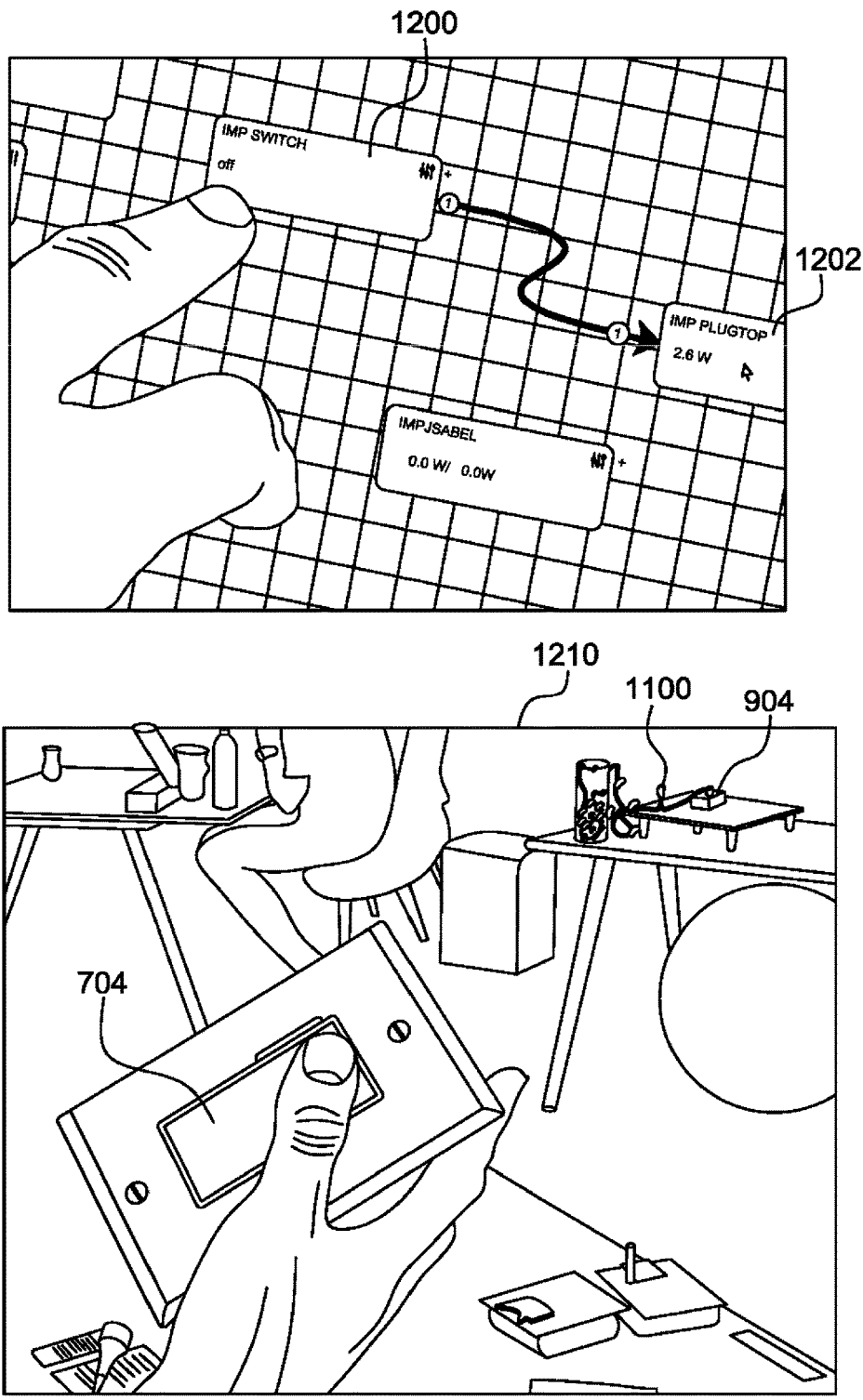
FIG. 12 shows the user configuring the Imp cloud service to enable the Imp enabled power switch from FIG. 7 to control the Imp enabled AC power switch from FIG. 11A.

FIG. 12 shows the user using the web browser based graphical programming system for the Imp cloud service (1200) to configure the Imp enabled light switch (704) from FIG. 7 to now control (1202) the operation of the Imp enabled AC power switch (904).

Other variations on these basic schemes are also possible.

For arbitrary devices that possess an Imp slot, an alternative process is:

1. An enrollment Imp (an Imp known to the server as one which is being used in a factory to associate unique device IDs with a hardware type) is inserted into a new arbitrary device.

2. The enrollment Imp uses the local WiFi configuration parameters or credentials previously stored within its non-volatile memory to establish a connection to the server.

3. The server sends the enrollment Imp the appropriate factory test software for the device, which is run within the Imp virtual machine (VM) software environment.

4. The test software is run. If the test (checking the arbitrary device's functionality) passes, then the test software tells the server that the device passed, and the server then stores the association between the device's ID and the hardware type, so that in the future the device will get the right software. The server can also store a record that a device was "built" successfully.

5. If the test fails, the test software tells the server, and the server notes that the device failed test.

Alternatively, for arbitrary device units with an embedded Imp communications module 1. The enrollment imp can still be used, however instead of plugging into a non-existent slot in the embedded Imp devices, instead the enrollment Imp operates by sending "blinkup packets", i.e. optical light pulses that include both network setup information and a hardware-identifying token (software token) to the device.

2. The arbitrary device/embedded Imp combination connects to the local WiFi and sends the software token to the server.

3. The server recognizes the token as a factory token, and sends the device the test code, which is again run on the embedded Imp virtual machine (VM) software environment. Subsequent steps 4 and 5 are then done as above.

In FIG. 12 (1210), the user is now using the Imp enabled light switch (704) to control lights (1100) via Imp enabled AC power switch (904). Note that the control pathway goes through the Imp cloud service (207) and server (312) as shown in FIGS. 3 and 4, and thus the Imp enabled AC power switch (904) could literally be on the other side of the world away from Imp enabled light switch (704), and assuming good internet connections, the system would work perfectly.

Figure 13:
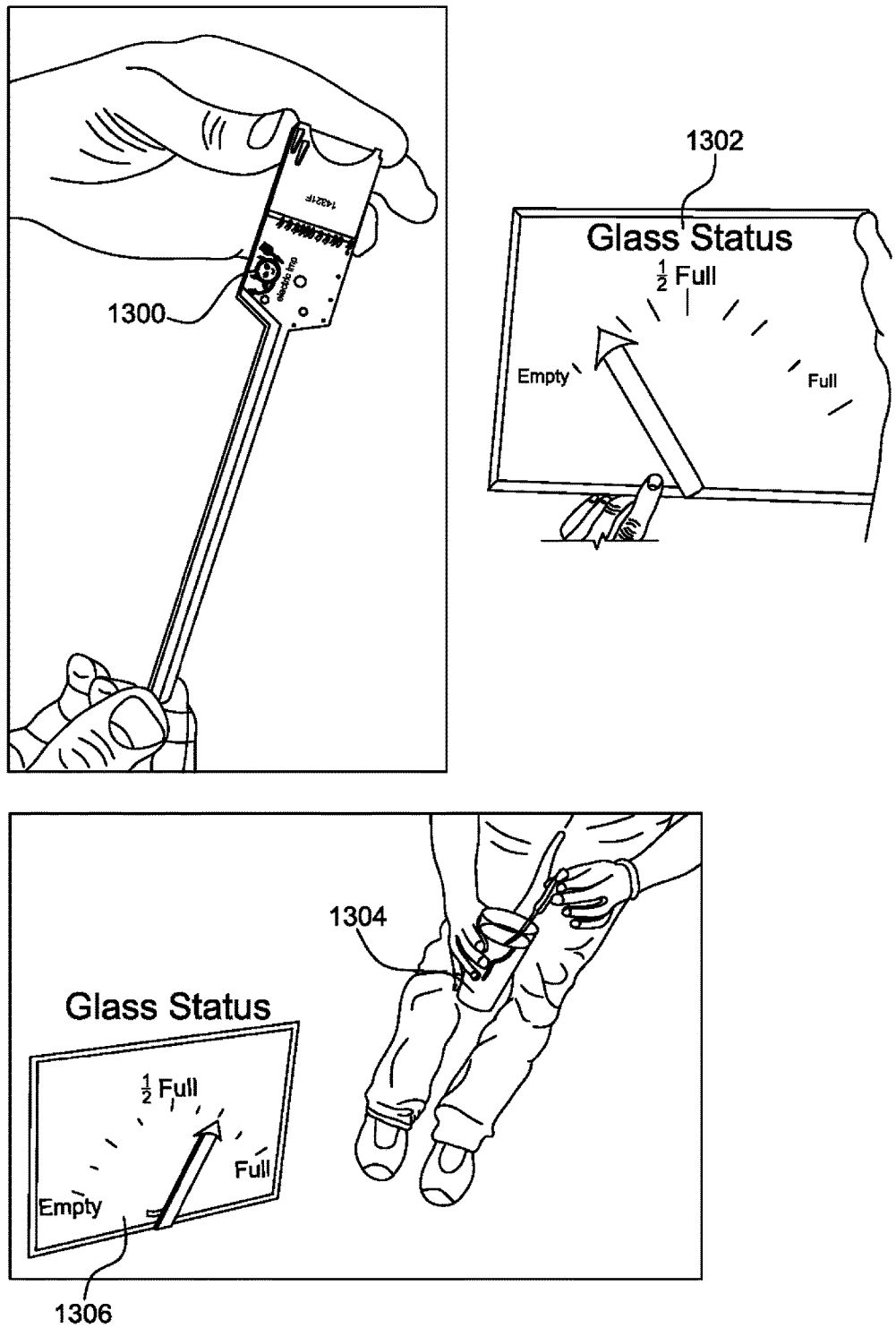
FIG. 13 shows an Imp enabled moisture detector.

FIG. 13 shows how an Imp-enabled moisture detector (1300) and an Imp-enabled servo motor (here hooked up to a 2×3 foot white board (1302) with a large cardboard pointer, with hand drawn level markers on the white board) can be quickly configured so that when the moisture detector is dunked into a glass of water (1304), the makeshift level display device almost instantly functions like a giant fluid level gauge (1306). Again, because the connecting "glue" logic and communications pathways go via the Imp cloud service (207) and server (312), the actual gauge (1302) could be located anywhere, such as literally on the other side of the world.

Figure 14:
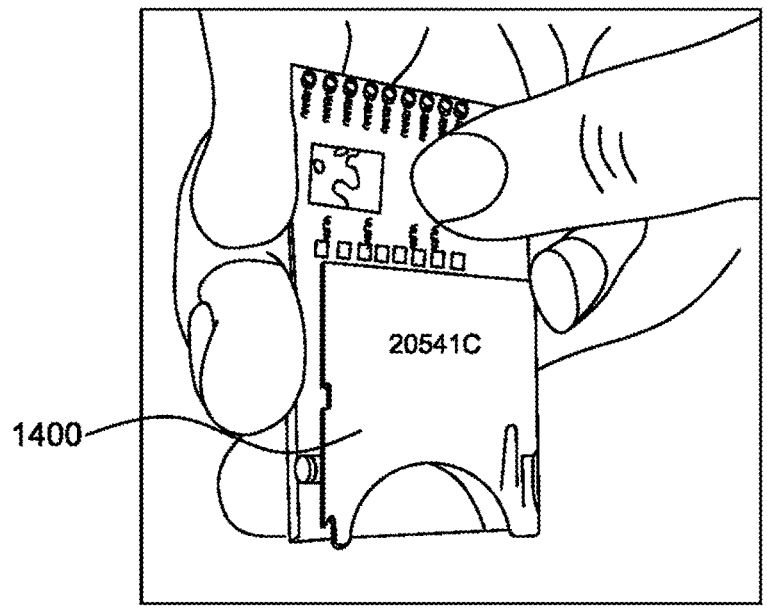
FIG. 14 literally gives an example of a "better mousetrap" (here an Imp-enabled electric mousetrap) that has been inexpensively network enabled according to the invention.
Figure 14:
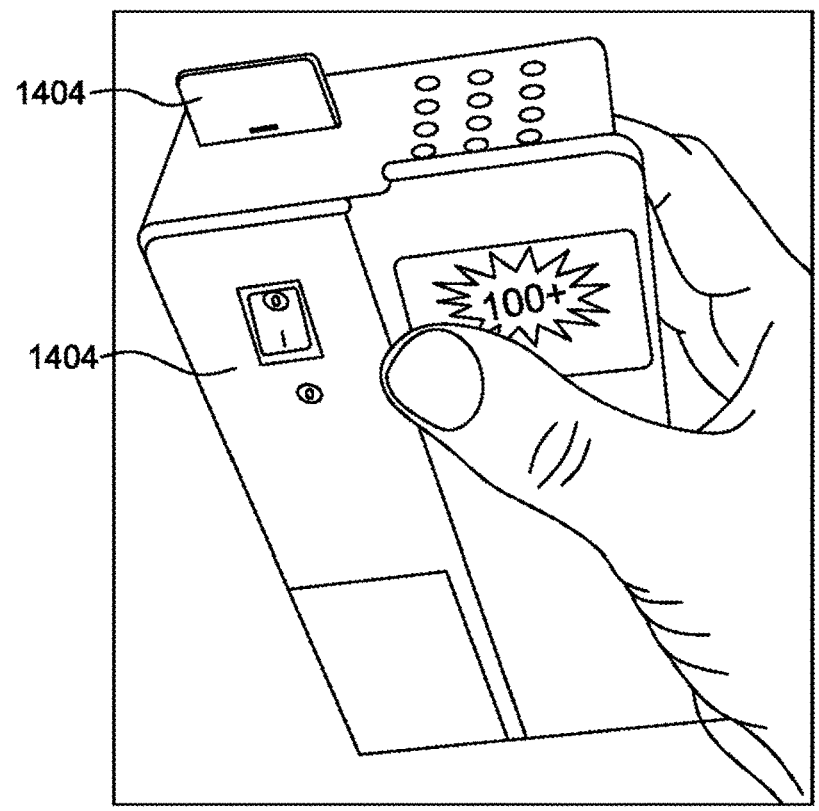

FIG. 14 gives an example of what is literally a "better mousetrap", that has been network enabled according to the invention. Here the Imp slot (a general purpose Imp socket) is shown as (1400). This Imp slot is then installed in the electronic mousetrap device (1402), and the Imp (1404) is shown protruding from the installed Imp slot. Here the actual cost of Imp-enabling the mousetrap only adds about $1.00 in materials to the mousetrap, which has a nominal retail price of about $20.00.

More specifically a Victor M2524 Electronic Mouse Trap, which is a low cost (approximately $20) battery powered electronic device that humanely kills mice by a high voltage shock (1404), was modified at roughly a cost of $1.00 to also include the Imp adapter (Imp slot) (1400). The modified electronic mouse trap is now internet enabled, and can for example notify its user, regardless of the user's location anywhere in the world, when the device has dispatched another mouse.

Examples of other types of applications include Imp-enabled door locks that could be unlocked via cell phone SMS messages, and sophisticated plant watering systems that can integrate Imp-enabled moisture and temperature sensors with internet available weather forecasts, and intelligently water plants accordingly using Imp-enabled water control valves or pumps. Imp-enabled washing machines or dryers could send text messages to users when the laundry is done. Imp-enabled motion sensors can be placed in the homes of elderly or disabled individuals, and the Imp cloud service could be set to send text messages or other warning signals to responsible individuals or services if the motion sensor detects that the elderly or disabled individual has not visited a certain room, such as the kitchen or bathroom, within the individual's normal time parameters.

Thus the invention makes it economically feasible to web-enable even extremely low cost devices that other words would normally not be web enabled.

Additional Software and Hardware Discussion and Examples

The Imp device and software will often support various wireless Internet encryption schemes such as WEP, WPA and WPA2 encryption schemes as well as WPS setup.

As discussed elsewhere in this specification, the Imp device software can typically be developed by vendors or users using a web-based integrated development environment (IDE). Here, for example, a web-based console may shows how many Imp-enabled devices of interest to the user are online, and the system also allows software updates to be instantly pushed to customers via an Internet server such as the Imp cloud service.

Also as discussed elsewhere in this specification, Imp enabled devices may be controlled or managed by one or more Internet servers (e.g. FIG. 5 (312)), such as the Imp cloud service. In principle such an Imp cloud service can serve anywhere from one Imp or Imp-enabled device to all the Imps in the world. This standardized Imp cloud service can thus relieve vendors from the need to operate Imp control services of their own (although they may of course do so as needed and negotiated).

As previously discussed, the invention can also enable Imps to interact, exchange messages with, and be controlled by phones such as cellular phones and Smartphones. As one example, a Smartphone app may be developed that in turn allows various Imp-related mini-applets be displayed within the app. These apps can allow monitoring and control of various Imp-enabled individual devices from a single application, and this again reduces the development burden significantly. Additionally, the Imp control Internet servers or Imp cloud service can provide application programming interfaces (API) to further reduce the vendor development burden.

The Imp cloud service can also allow various Imp-enabled devices to interact with other standard Internet communications methods, often through various gateways such as email, SMS and Twitter gateways. The Imp cloud service can also allow different Imp-enabled devices from multiple vendors to work together harmoniously.

As previously discussed, to facilitate Imp-enabling various arbitrary devices, often it will be useful to further provide a standardized slot device (Imp slot) that can accept the Imp communications module device, and then be easily be integrated by the vendor of an arbitrary device into the arbitrary device, thereby Imp-enabling the arbitrary device. In some embodiments, such standardized slot devices can be built for a cost of under about $1.00 using a minimal bill of materials (BOM). An example of the minimum circuitry needed to provide a standardized slot device is shown below in Table 1:

TABLE 1

Example of the components in an Imp slot (standardized slot device).

| Item | Description | Price |
|---|---|---|
| Proconn SDC009 Socket | Socket for Imp device to plug into. The antenna in the Imp device is tuned to work well with this socket | $0.45 |
| Atmel ATSHA204 ID chip | Holds a unique product ID used to identify the device to the IMP service | $0.32 |
| 0.1 uF capacitor | Bypass capacitor for the ATSHA204 | $0.01 |
| 100k resistor | Pull-up resistor for ATSHA204 communication line | $0.01 |
| Total | | $0.79 |

Suitable power supplies may also be provided. A schematic of one embodiment of a standardized slot device is shown in FIG. 16.

As previously discussed, the Imp communications module or Imp device will generally comprise a WiFi interface, supporting 2.4 GHz 802.11b/g/n, and a 32-bit processor, such as an ARM family processor. In the Imp prototypes disclosed herein, an ST STM32F205 SoC processor, which is based on an ARM Cortex-M3 core, was used. This processor has respectable computing power, roughly on the order of an Intel Pentium-90 processor.

To allow the Imp communications module to control the arbitrary device, arbitrary device control software (e.g. vendor code) needed to operate or control the arbitrary device may be loaded into a virtual machine within the Imp device. To create a standardized Imp system that can be used by multiple vendors for multiple arbitrary devices, it will often be useful to configure any particular arbitrary device control software so that it generally only needs to deal with the actual arbitrary device-specific functions. To facilitate use with many arbitrary devices and vendors, often it will be useful to configure the Imp system software so that other more standardized functions such as networking, security, power management, and the like can all be automatically controlled by a standardized Imp software package.

Imp Communications Module Hardware Example:

In one embodiment, such as an SD card embodiment shown in FIG. 15 (1500), the Imp communications module device or "card" may have 9 pins; of these 9, two pins (such as pin 3 and 4) may be used for ground and power, and one pin, such as pin 6, may be used to communicate with the arbitrary device's ID chip (this ID chip may often be placed on the standardized slot device). The other 6 pins may be multipurpose—that is they can be configured in software to suit the particular arbitrary device that the card is plugged into.

The actual size of the SD card Imp embodiment is approximately 32×24×2.1 mm. This actual size is shown at approximately 1:1 scale in FIG. 15 (1502).

In some embodiments, every pin, or at least every non-power and non-ID chip pin, can function as an analog input, digital input or output, or a Pulse Width Modulation (PWM) output. In addition, in some embodiments, the various IMP device pins can be configured to provide standard interfaces such as: I2C (master or slave), SPI (master or slave), UART, DAC, Pulse counter, Wakeup and the like. An example of these various configurations is shown in FIG. 15 (1504).

Imp programming methods: In some embodiments, the arbitrary device code may be written in a high level programming language or scripting language such as Lua or Squirrel. The standardized Imp software package may also include functions to allow access to the hardware interfaces to the arbitrary device, as well as functions to communicate with Internet servers such as the Imp-cloud service.

The vendor code used to manage the arbitrary device through the Imp will often communicate with the Internet server (e.g. FIG. 5, (312)) by sending and receiving messages. Some messages may be for arbitrary device control, and some messages may be generated to be passed to other devices (e.g. other Imp-enabled arbitrary devices) in the user's network, or to and from other types of software running on the Internet server. These various messages can be in any form, including scalars, strings and tuples.

In some embodiments, it will be useful to provide an open API on the Imp management server (Imp cloud service) that can allow various Imp-enabled arbitrary devices to communicate with other over communications networks (email, SMS, twitter, etc), web pages (display data and controls on a webpage which can be accessed from anywhere), and even to talk to private internet services (such as that the vendor may provide) over separate TCP connections.

Imp power requirements: In some embodiments, the Imp communications module device may have several operational states, each with different power requirements. Examples of these various Imp operational states are shown in Table 2 below:

TABLE 2

Examples of various IMP operational states and power consumptions

| CPU | Radio | Description | Current/Power |
|---|---|---|---|
| Active | Max power TX | Peak current during 802.11b TX. Power supply should be sized to supply this peak current | 400 mA/1.3 W |

TABLE 2-continued

Examples of various IMP operational states and power consumptions

| CPU | Radio | Description | Current/Power |
|---|---|---|---|
| Active | RX | Average current during reception | 70 mA/230 mW |
| Active | Low power mode | Listening to beacons only | 15 mA/50 mW |
| Active | Off | Local processing | 10 mA/33 mW |
| Sleep | Off | Wake in ~1 µs on GPIO transition or timer | 1 mA/3.3 mW |
| Off | Off | Wake on pin 1 or RTC. Time to wake typically <1 s | 6 µA/20 uW |

Because the sleep power requirement is so low, battery powered Imp-enabled sensors can have a very long battery life. For example, an Imp-enabled temperature sensor which wakes once per hour may have a power profile that looks like this:

TABLE 3 power consumption of an Imp enabled temperature sensor

| Mode | Description | Time in mode | mAh per day |
|---|---|---|---|
| Sleep | Waiting for RTC wake | 86376 seconds (24 hours minus 24 seconds) | 0.143 mAh |
| Wake | Wake, sample temperature, send to server, re-enter sleep mode | 24 seconds (1 s per wake) | 0.6 mAh |
| Total | | 24 hours | 0.743 mAh |

Thus the average Imp power requirement can be very low. Here, for example, a 600 mAh $LiFeO_4$ cell would last over two years in this application.

Arbitrary device types: Although often an arbitrary device may be capable of functioning on its own without an Imp communications module, in some embodiments, the arbitrary device may not be capable of functioning on its own without an Imp communications module.

For example a bathroom scale type arbitrary device could be "Imp Ready". That is, the scale would measure and display weight without an Imp communications module, but with an Imp communications module installed might also forward the user's weight to an Internet server.

Alternatively, "Imp Powered" type arbitrary devices may have little or no functional behavior when the Imp is removed. Here, for example, a temperature sensor type arbitrary device comprising an electronic temperature sensor with an I2C communications interface may not necessarily need any control processor other than the processor provided with an Imp device. Thus to reduce costs, this temperature sensor type arbitrary device may be designed so that it is only capable of function when the Imp device is attached.

As previously discussed, in some embodiments, such as the Imp prototypes reported in this disclosure, the Imp may require a more capable power supply, such as a 400 mA, 3.3V power supply, at least for powering the Imp during times of peak power consumption, such as the several seconds required for firmware updates. Often however, such Imp devices may operate substantially lower power levels.

As previously discussed, and as illustrated in FIG. 15 (1504), in addition to acting as a General Purpose Input and Output (GPIO), each pin on the Imp device can be configured to one of several hardware specialized functions. While pins may only have one function at a time, they may be reconfigured during run-time to change that function. For example, a pin may first be configured as a DAC and then reconfigured as an ADC. Additionally, not all the pins in a hardware function need to be assigned to that function. For example, pins 8 and 9 could be used as UART1 and pins 1 and 2 could be used as I2C2. Alternatively, when used for one arbitrary device, Imp pin 8 could be a UART transmitter pin, and pin 9 could be a UART receiver pin. However when the same Imp is used for an alternative arbitrary device, although Imp pin 8 might still be a UART transmitter pin, the function of Imp pin 9 might be reassigned, for example, to be a PWM pin, or an analog input pin, or other type function.

Thus in this embodiment, the Imp is generally designed to let the vendors (through the Imp software) pick and choose and software reassign Imp pin functions on a pin-by-pin basis. Note however that there is an exception to this general pin function flexibility, in that in this embodiment, pin 6 is reserved for the ID chip, and may not be used for any other purpose.

FIG. 16 shows an example of a circuit diagram of a standardized slot device (Imp slot) for receiving the SD card type Imp communications module(s). This standardized slot device may include an optional input power connector (1600), show here with reverse voltage protection for the battery, and an optional 3.3 volt buck power supply for the Imp device (1602). The slot device may also include an Imp card slot and ID chip (1604), (1606), and a circuit connection area or "breakout area" (1608) where the electrical connections from the arbitrary device may be attached to the various Imp pins from the Imp socket (1604).

Note that in some embodiments, the Imp slot may be a non-user accessible slot, or the Imp communications module may be permanently embedded in the arbitrary device.

SUMMARY

The present invention greatly simplifies the task of creating new types of connected electronic devices. It does so by bringing the power of an easy to use, cloud-based service to almost any device and allowing the internet to interact with everyday objects.

An important component of the invention, occasionally referred to as an "Imp" is a tiny (e.g. SD card sized), user-installable card which contains both WiFi and an embedded processor. The Imp card is designed to be inserted into almost any product. The Imp card connects wirelessly over WiFi links and the internet to one or more internet servers, here occasionally referred to as the "Imp cloud service". These internet servers allow the various Imp devices to both talk to other devices, and also communicate with users and services via the internet.

Once an Imp device is connected to a target device, and is also connected over the wireless WiFi links to the Imp cloud service, a user can monitor and control the Imp device from anywhere in the world using an internet browser through a computerized device (e.g. desktop computer, laptop computer, tablet computer, smartphone and the like). The Imp cloud service can also be used to link any given Imp, and also link any given Imp device to other devices and services to build intelligent behaviors. Thus for example, a user could get a text message from an Imp enabled washing machine when the wash is done. As another example, a user could have the user's irrigation system automatically controlled by using an Imp enabled solar-powered soil moisture sensor. Here, the Imp device can be software configured to only use WiFi on an occasional basis (e.g. every few minutes or hours), thus keeping the overall Imp power consumption needs well within the energy budget of the power produced by a solar panel with a surface area of only 1-10 square inches, for example.

For device manufacturers, adding an Imp slot is easy and cost-effective—in many cases the cost of additional parts is less than a dollar. Once a device is Imp-enabled, inserting an Imp connects the device to the cloud of other Imp-enabled devices and services, without the need to build or manage a web service. Because of the simplicity of integrating the Imp, even low-volume or custom devices can become connected allowing almost any niche to become part of the larger world. In some embodiments, upon manufacturer request, the Imp module can be made a permanent part of the device (i.e. it can be made not removable). In this case a dedicated slot need not be used, and instead the Imp communications module can be soldered or otherwise embedded into the arbitrary device electronics.

Note that such embedded arbitrary devices do not need to have their own unique ID component and chip, and instead the unique ID code can instead be placed in a protected memory area on the embedded IMP module itself. Note further that to enable the embedded IMP to be optically configured, it may be necessary in some embodiments to place the IMP's photodiode closer to the surface or other optically accessible are of the arbitrary device.

Because the Imp system is a standardized system of Imp cards, Imp slots, and the Imp cloud service, capable of being scaled up to handle millions of Imp devices worldwide, due to economies of scale, the system can be extensively debugged and cost-optimized.

Thus for consumers, the high reliability of such a high volume standardized system in turn allows them to have confidence that any given Imp enabled product will work seamlessly with every other Imp-enabled device on the market, regardless of type or manufacturer, and that its capability will only expand as more devices and services come to market.

Thus the invention can be used to connect and web-enable almost everything. The invention provides a novel type of platform to, with very little effort, tie nearly every device together.

The invention claimed is:

1. A method of adding a network interface and network control to an arbitrary non-network connected device (arbitrary device), said arbitrary device having electrical circuitry to implement functionality of said arbitrary device, said method comprising:
providing a communications module interface in said arbitrary device to accommodate a communications module;
said communications module interface configured to interact with said communications module and carry control signals to at least some of said arbitrary device electrical circuitry;
said communications module having a wireless network interface configured to establish a communications session with a computer network;
said communications module having solid state memory configured to store capable of storing code and data, wherein at least some of said code is used to operate said arbitrary device, and at least some of said code is used to operate said communications module;
said communications module having at least one internal processor, said at least one internal processor configured to at least execute said code when said internal processor is connected to said communications module interface in said arbitrary device;
wherein said code to operate said communications module configures the at least one internal processor of said communications module to operate as a sandbox or virtual machine manner to isolate said code used to operate said arbitrary device from said code used to operate said communications module, and which mitigates adverse impact of program crashes or errors by preventing program crashes or errors in a portion of said code that operates said arbitrary device from interfering with a portion of said code that operates said communications module's said network interface.

2. The method of claim 1, wherein:
a: any of said communications module and said arbitrary device additionally having a unique ID storage memory device configured to transmit unique identification data associated with a type of said arbitrary device; or
b: wherein said communications module has a unique ID, and an association between said communication's module and said arbitrary device is stored in an external server or other remote device.

3. The method of claim 1, wherein when said communications module is embedded or built into said communications module interface, said communications module interface is configured to connect to said communications module.

4. The method of claim 1, wherein if said code to operate said arbitrary device using said communications module has not been previously loaded into the communications module, then using at least the network connection and a unique ID of said communications module to load said code to operate said arbitrary device.

5. The method of claim 1, wherein commands or data to said arbitrary device are transmitted through said network, to said communications module, and are interpreted by said at least one processor running said code to operate said arbitrary device, and wherein said at least one internal processor in turn sends control signals to said arbitrary device's electrical circuitry.

6. The method of claim 1, wherein commands or data from said arbitrary device's electrical circuitry are transmitted to said communications module, are interpreted or processed by said at least one internal processor running any of said code to operate said communications module and said code to operate said arbitrary device, and transmitted using said network interface to said network.

7. The method of claim 1, used to control at least two arbitrary devices, each of said at least two arbitrary devices equipped with a communications module, said method comprising:
establishing network connections between said communications modules and at least one internet server;
using said at least one internet server to relay commands or data from a first arbitrary device and communication module to a second arbitrary device and communications module; or
using said at least one internet server to relay commands or data from at least one arbitrary device equipped with a communications module to an outside human or automated recipient; or
using said at least one internet server to relay commands or data from an outside human or automated source to at least one arbitrary device equipped with a communications module.

8. The method of claim 1, further configuring at least one internet server with instructions to manage operation of said arbitrary devices and communications modules of at least two said arbitrary devices by:

a: using a web browser with a network connection to said at least one internet server, and providing a graphical or rule based arbitrary device or communications module configuration environment to said web browser; and using said graphical or rule based arbitrary device or communications module configuration environment on said web browser to configure said at least one internet server with said instructions; or b: providing a paired virtual machine within said at least one internet server, which can them execute arbitrary application code or middleware which that interfaces said arbitrary device's input and output with other servers via web APIs or other internet protocols.

9. The method of claim 1, wherein said arbitrary device is otherwise capable performing at least some functions of said arbitrary device functions in a non-network connected mode when said communications module is absent.

10. The method of claim 1, wherein said code to operate said arbitrary device is configured to operate said arbitrary device in at least an alternate fallback mode when local network connectivity is absent and connectivity to the Internet or to an Internet server configured to provide instructions to said communications modules is absent.

11. The method of claim 1, wherein said communications module comprises a plurality of communications modules, each of said communications modules configured to locally network and interact on a peer-to-peer basis at least when network connectivity to the Internet and to an Internet server configured to provide capable of providing instructions to said communications modules is absent.

12. The method of claim 1, wherein said communications module further comprises at least one photodetector; further configuring said communications module for a particular wireless network configuration by optically transmitting information pertaining to said particular network configuration to said communications module.

13. The method of claim 1, wherein said communications module interface is a communications module interface device designed to be compatible with a plurality of different types of arbitrary devices, and wherein said communications module interface device comprises a socket for said communications module, an identification chip, a communications module power supply, and interface circuitry that provides an electrical interface between said communications module and said arbitrary device electrical circuitry.

14. The method of claim 1, wherein said communications module interface is a non-user accessible communications module interface, or wherein said communications module is an embedded communications module that is permanently embedded in said arbitrary device.

15. The method of claim 14, wherein said embedded communications module has its own unique ID that can be transmitted to at least one internet server.

16. The method of claim 1, wherein said code to operate said communications module uses a hypervisor to configure the at least one internal processor of said communications module to operate as a sandbox or virtual machine.

17. The method of claim 1, further using said sandbox or virtual machine to increase security from attack by preventing secrets required to secure a communications link to said computer network from being available to said code used to operate said arbitrary device (application code).

18. The method of claim 1, wherein said communications module interface comprises a position and electrical connections in the electrical circuitry of said arbitrary device to accommodate said communications module.

19. A method of adding a network interface and network control to an arbitrary non-network connected device (arbitrary device), said arbitrary device having electrical circuitry to implement functionality of said arbitrary device, said method comprising:

providing a communications module interface in said arbitrary device to accommodate a communications module;

said communications module interface configured to interact with said communications module and carry control signals to at least some of said arbitrary device electrical circuitry;

said communications module having a wired or wireless network interface configured to establish a communications session with a computer network;

said communications module having solid state memory configured to store capable of storing code and data, wherein at least some of said code is used to operate said arbitrary device, and at least some of said code is used to operate said communications module;

said communications module having at least one internal processor, said at least one internal processor configured to at least execute said code when said internal processor is connected to said communications module interface in said arbitrary device;

wherein said code to operate said communications module configures the at least one internal processor of said communications module to operate as a sandbox or virtual machine manner to isolate said code used to operate said arbitrary device from said code used to operate said communications module, and which mitigates adverse impact of program crashes or errors by preventing program crashes or errors in a portion of said code that operates said arbitrary device from interfering with a portion of said code that operates said communications module's said network interface.

* * * * *